US012739086B2

(12) United States Patent
Hu et al.

(10) Patent No.: US 12,739,086 B2
(45) **Date of Patent: *Sep. 15, 2026**

(54) DISTRIBUTED-TONE RESOURCE UNIT TRANSMISSION ON FREQUENCY SUBBLOCK OF WIDE BANDWIDTH IN WIRELESS COMMUNICATIONS

(71) Applicant: MediaTek Inc., Hsinchu City (TW)

(72) Inventors: Shengquan Hu, San Jose, CA (US); Jianhan Liu, San Jose, CA (US); Thomas Edward Pare, Jr., San Jose, CA (US)

(73) Assignee: MediaTek Inc., Hsinchu City (TW)

(*) Notice: Subject to any disclaimer, the term of this patent is extended or adjusted under 35 U.S.C. 154(b) by 265 days.

This patent is subject to a terminal disclaimer.

(21) Appl. No.: 18/655,235

(22) Filed: May 4, 2024

(65) Prior Publication Data

US 2024/0372688 A1 Nov. 7, 2024

Related U.S. Application Data

(60) Provisional application No. 63/500,299, filed on May 5, 2023.

(51) Int. Cl.
*H04L 5/00* (2006.01)

(52) U.S. Cl.
CPC .......... *H04L 5/0094* (2013.01); *H04L 5/0053* (2013.01)

(58) Field of Classification Search
CPC .... H04L 5/0053; H04L 5/0094; H04W 84/02; H04W 84/12
See application file for complete search history.

(56) References Cited

U.S. PATENT DOCUMENTS

| | | | | |
|---|---|---|---|---|
| 12,192,127 B2* | 1/2025 | Hu | H04L 5/0032 | |
| 12,199,640 B2* | 1/2025 | Park | H03M 13/255 | |
| 2020/0014509 A1* | 1/2020 | Asterjadhi | H04L 5/0041 | |
| 2021/0160889 A1* | 5/2021 | Yang | H04L 5/0048 | |
| 2021/0288768 A1* | 9/2021 | Yang | H04L 5/0044 | |
| 2021/0392661 A1* | 12/2021 | Cao | H04W 72/0453 | |
| 2022/0263636 A1* | 8/2022 | Hu | H04L 5/0007 | |
| 2022/0345263 A1* | 10/2022 | Hu | H04L 5/0041 | |
| 2023/0104295 A1* | 4/2023 | Yang | H04L 5/0041 | 370/329 |
| 2023/0124579 A1* | 4/2023 | Yang | H04L 5/0092 | 370/328 |
| 2023/0179332 A1* | 6/2023 | Hu | H04L 1/0084 | 370/329 |
| 2024/0195582 A1* | 6/2024 | Gong | H04L 5/0041 | |
| 2024/0205899 A1* | 6/2024 | Gong | H04W 72/0453 | |
| 2024/0357520 A1* | 10/2024 | Gong | H04W 72/04 | |
| 2025/0080289 A1* | 3/2025 | Lim | H04L 5/0053 | |

* cited by examiner

*Primary Examiner* — Kent Krueger

(74) *Attorney, Agent, or Firm* — Andy M. Han; Han IP PLLC

(57) ABSTRACT

Techniques pertaining to distributed-tone resource unit (DRU or dRU) transmission of frequency subblocks or frequency segments of wide bandwidths in wireless communications are described. An apparatus (e.g., station (STA)) generates a DRU with tones or subcarriers of the DRU distributed in a frequency segment or subblock. The apparatus then communicates wirelessly with the DRU in the frequency segment or subblock of a bandwidth of 240 MHz or wider.

18 Claims, 21 Drawing Sheets

| Frequency Subblock Size | BW80 | BW160 | BW320 |
|---|---|---|---|
| 20MHz | 120+[-500,-253,12,259] | 120÷[-1012, -765, -500, -253, 12, 259, 524, 771] | 120+[-2036, -1789, -1524, -127,7 -1012, -765, -500, -253, 12, 259, 524, 771, 1036, 1283, 1548, 1795] |
| 40MHz | [-1,1]*256 | [-3,-1,1,3]*256 | [-7,-5,-3,-1,1,3,5,7]*256 |
| 80MHz | 0 | [-1,1]*512 | [-3,-1,1,3]*512 |

| Frequency Subblock Size | BW80 | BW160 | BW320 |
|---|---|---|---|
| 20MHz | [-380,-133,132,379] | [-892,-645,-380,-133,132,379,644,891] | [ -1916, -1669, -1404, -1157, -892, -645, -380, -133, 132, 379, 644, 891, 1156, 1403, 1668, 1915] |
| 40MHz | [-256, 256] | [-768,-256,256,768] | [-1792,-1280,-768,-256,256,768,1280,1792] |
| 80MHz | 0 | [-512,512] | [-1536,-512,512,1536] |

200

| Frequency Subblock Size | BW80 | BW160 | BW320 |
|---|---|---|---|
| 20MHz | 120+[-500,-253,12,259] | 120+[-1012, -765, -500, -253, 12, 259, 524, 771] | 120+[-2036, -1789, -1524, -127,7 -1012, -765, -500,<br>-253, 12, 259, 524, 771, 1036, 1283, 1548, 1795] |
| 40MHz | [-1,1]*256 | [-3,-1,1,3]*256 | [-7,-5,-3,-1,1,3,5,7]*256 |
| 80MHz | 0 | [-1,1]*512 | [-3,-1,1,3]*512 |

| Frequency Subblock Size | BW80 | BW160 | BW320 |
|---|---|---|---|
| 20MHz | [-380,-133,132,379] | [-892,-645,-380,-133,132,379,644,891] | [ -1916, -1669, -1404, -1157, -892, -645, -380, -133, 132, 379, 644, 891, 1156, 1403, 1668, 1915] |
| 40MHz | [-256, 256] | [-768,-256,256,768] | [-1792,-1280,-768,-256,256,768,1280,1792] |
| 80MHz | 0 | [-512,512] | [-1536,-512,512,1536] |

| B7-B1 of the RU Allocation subfield | RU size | 20MHz subblock index M in 80MHz | 40MHz subblock index M in 80MHz |
|---|---|---|---|
| 0-8 | 26 | 0 | 0 |
| 9-17 | | 1 | |
| 18 | | reserved | |
| 19-27 | | 2 | 1 |
| 28-36 | | 3 | |
| 37-40 | 52 | 0 | 0 |
| 41-44 | | 1 | |
| 45-48 | | 2 | 1 |
| 49-52 | | 3 | |
| 53, 54 | 106 | 0 | 0 |
| 55, 56 | | 1 | |
| 57, 58 | | 2 | 1 |
| 59, 60 | | 3 | |
| 61 | 242 | 0 | 0 |
| 62 | | 1 | |
| 63 | | 2 | 1 |
| 64 | | 3 | |
| 65 | 484 | NA | 0 |
| 66 | | | 1 |

(B)

$$i = \begin{cases} 4*N+M, & \text{for dRU on 20MHz subblock} \\ 2*N+M, & \text{for dRU on 40MHz subblock} \\ N, & \text{for dRU on 80MHz subblock} \end{cases}$$

1100

PPDU Bandwidth

| Frequency Subblock Size (MHz) | BW80 | BW160 | BW240 | BW320 | BW480 | BW640 |
|---|---|---|---|---|---|---|
| 20 | 120+[-500,-253,12,259] | 120+[-1012, -765, -500, -253, 12, 259, 524, 771] | 120+[-1524,-1277,-1012,-765,-500,-253,12,259,524, 771, 1036, 1283] | 120+[-2036, -1789, -1524, -1277, -1012, -765, -500, -253, 12, 259, 524, 771, 1036, 1283, 1548, 1795] | 120+[-3060,-2813,-2548,-2301,-2036,-1789,-1524,-1277,-1012,-765,-500,-253, 12, 259, 524, 771,1036, 1283,1548,1795,2060, 2307] | 120+[-4084,-3927,-3572,-3325,-3060,-2813,-2548,-2301,-2036,-1789,-1524,-1277,-1012,-765,-500,-253,12, 12, 259, 524, 771,1036, 1283,1548,1795,2060, 2307,2572,2819,3084,3331,3596,3843] |
| 40 | [-1,1]*256 | [-3,-1,1,3]*256 | [-5,-3,-1,1,3,5]*256 | [-7,-5,-3,-1,1,3,5,7]*256 | [-11,-9,-7,-5,-3,-1,1,3,5,7,9,11]*256 | [-15:2:15]*256 |
| 80 | 0 | [-1,1]*512 | [-1,0,1]*1024 | [-3,-1,1,3]*512 | [-5,-3,-1,1,3,5]*512 | [-7,-5,-3,-1,1,3,5,7]*512 |
| 160 | N/A | 0 | [-1,1]*512 | [-1,1]*1024 | [-1,0,1]*2048 | [-3,-1,1,3]*1024 |
| 240 | N/A | N/A | 0 | [-1,1]*512 | [-1,1]*1536 | [-5, -3, 3, 5]*512 |
| 320 | N/A | N/A | N/A | 0 | [-1,1]*1024 | [-1,1]*2048 |
| 480 | N/A | N/A | N/A | N/A | 0 | [-1,1]*1024 |

$K_{shift}$ values

FIG. 11

| Data and pilot subcarrier indices for dRU in a 20 MHz EHT PPDU | | | | | |
|---|---|---|---|---|---|
| dRU type | dRU index and subcarrier range | | | | |
| 26-tone dRU i=1:9 | dRU1 [-120:9:-12, 6:9:114] | dRU2 [-116:9:-8, 10:9:118] | dRU3 [-118:9:-10, 8:9:116] | dRU4 [-114:9:-6, 12:9:120] | dRU5 [-112:9:-4, 5:9:113] |
| | dRU6 [-119:9:-11, 7:9:115] | dRU7 [-115:9:-7, 11:9:119] | dRU8 [-117:9:-9, 9:9:117] | dRU9 [-113:9:-5, 4:9:112] | |
| 52-tone dRU i=1:4 | dRU1 26-tone [dRU1, dRU2] | | dRU2 26-tone [dRU3, dRU4] | | |
| | dRU3 26-tone [dRU6, dRU7] | | dRU4 26-tone [dRU8, dRU9] | | |
| 106-tone dRU i=1:2 | dRU1 26-tone [dRU1~4], [-3, 3] | | dRU2 26-tone [dRU6~9], [-2, 2] | | |

1300

| Data and pilot subcarrier indices for dRU in a 40 MHz EHT PPDU | | | | | | |
|---|---|---|---|---|---|---|
| dRU type | dRU index and subcarrier range | | | | | |
| 26-tone dRU i=1:18 | dRU1 [-242:18:-26, 10:18:226] | dRU2 [-233:18:-17, 19:18:235] | dRU3 [-238:18:-22, 14:18:230] | dRU4 [-229:18:-13, 23:18:239] | dRU5 [-225:18:-9, 27:18:243] | dRU6 [-240:18:-24, 12:18:228] |
| | dRU7 [-231:18:-15, 21:18:237] | dRU8 [-236:18:-20, 16:18:232] | dRU9 [-227:18:-11, 25:18:241] | dRU10 [-241:18:-25, 11:18:227] | dRU11 [-232:18:-16, 20:18:236] | dRU12 [-237:18:-21, 15:18:231] |
| | dRU13 [-228:18:-12, 24:18:240] | dRU14 [-234:18:-18, 18:18:234] | dRU15 [-239:18:-23, 13:18:229] | dRU16 [-230:18:-14, 22:18:238] | dRU17 [-235:18:-19, 17:18:233] | dRU18 [-226:18:-10, 26:18:242] |
| 52-tone dRU i=1:8 | dRU1 [-242:9:-17, 10:9:235] | | dRU2 [-238:9:-13, 14:9:239] | | dRU3 [-240:9:-15, 12:9:237] | |
| | dRU4 [-236:9:-11, 16:9:241] | | dRU5 [-241:9:-16, 11:9:236] | | dRU6 [-237:9:-12, 15:9:240] | |
| | dRU7 [-239:9:-14, 13:9:238] | | dRU8 [-235:9:-10, 17:9:242] | | | |
| 106-tone dRU i=1:4 | dRU1 26-tone [dRU1~4], [-8,5] | | dRU2 26-tone [dRU6~9], [-6,7] | | dRU3 26-tone [dRU10~13], [-7,6] | |
| | dRU4 26-tone [dRU15~18], [-5,8] | | | | | |
| 242-tone dRU i=1:2 | dRU1 106-tone [dRU1~2],26-tone dRU5, [-244,-4,3,9] | | dRU2 106-tone [dRU3~4],26-tone dRU14, [-243,-3,4,244] | | | |

1400

| [illegible] | | | | |
|---|---|---|---|---|
| [illegible] | dRU index and subcarrier range | | | |
| [illegible] | dRU1<br>[-483:36:-51, 17:36:449],[-467:36:-35, 33:36:465] | dRU2<br>[-475:36:-43, 25:36:457],[-459:36:-27, 41:36:473] | dRU3<br>[-479:36:-47, 21:36:453],[-463:36:-31, 37:36:469] | dRU4<br>[-471:36:-39, 29:36:461],[-455:36:-23, 45:36:477] |
| | dRU5<br>[-477:36:-45, 23:36:455],[-461:36:-29, 39:36:471] | dRU6<br>[-469:36:-37, 31:36:463],[-453:36:-21, 47:36:479] | dRU7<br>[-481:36:-49, 19:36:451],[-465:36:-33, 35:36:467] | dRU8<br>[-473:36:-41, 27:36:459],[-457:36:-25, 43:36:475] |
| | dRU9<br>[-482:36:-50, 18:36:450],[-466:36:-34, 34:36:466] | dRU10<br>[-474:36:-42, 26:36:458],[-458:36:-26, 42:36:474] | dRU11<br>[-478:36:-46, 22:36:454],[-462:36:-30, 38:36:470] | dRU12<br>[-470:36:-38, 30:36:462],[-454:36:-22, 46:36:478] |
| | dRU13<br>[-476:36:-44, 24:36:456],[-460:36:-28, 40:36:472] | dRU14<br>[-468:36:-36, 32:36:464],[-452:36:-20,48:36:480] | dRU15<br>[-480:36:-48, 20:36:452],[-464:36:-32, 36:36:468] | dRU16<br>[-472:36:-40, 28:36:460],[-456:36:-24, 44:36:476] |
| [illegible] | dRU1<br>52-tone [dRU1~2], [-495, 485] | dRU2<br>52-tone [dRU3~4],[-491, 489] | dRU3<br>52-tone [dRU5~6],[-489, 491] | dRU4<br>52-tone [dRU7~8],[-493, 487] |
| | dRU5<br>52-tone [dRU9~10],[-494, 486] | dRU6<br>52-tone [dRU11~12],[-490,490] | dRU7<br>52-tone [dRU13~14],[-488,492] | dRU8<br>52-tone [dRU15~16],[-492,488] |
| [illegible] | dRU1<br>[-499:4:-19, 17:4:497] | | dRU2<br>[-497:4:-17, 19:4:499] | |
| | dRU3<br>[-498:4:-18, 18:4:498] | | dRU4<br>[-496:4:-16, 20:4:500] | |
| [illegible] | dRU1<br>[-499:2:-17, 17:2:499] | | dRU2<br>[-498:2:-16, 18:2:500] | |

FIG. 14

Data and pilot subcarrier indices for Distributed Tone RUs (dRUs) in a 160 MHz PPDU

| | | | | |
|---|---|---|---|---|
| 106-tone dRU<br>i=1:16 | dRU1<br>[-1011:72:-579,-475:72:-43,69:72:429,533:72:965]<br>[-995:72:-563,-459:72:-99,13:72:445,549:72:981]<br>[-971:72:-539,-435:72:-75,29:72:461,565:72:925]<br>[-955:72:-595,-491:72:-59,53:72:485,589:72:949] | dRU2<br>[-1003:72:-571,-467:72:-35,77:72:437,541:72:973]<br>[-987:72:-555,-451:72:-91,21:72:453,557:72:989]<br>[-963:72:-531,-427:72:-67,37:72:469,573:72:933]<br>[-947:72:-587,-483:72:-51,61:72:493,597:72:957] | dRU3<br>[-1007:72:-575,-471:72:-39,73:72:433,537:72:969]<br>[-991:72:-559,-455:72:-95,17:72:449,553:72:985]<br>[-967:72:-535,-431:72:-71,33:72:465,569:72:929]<br>[-951:72:-591,-487:72:-55,57:72:489,593:72:953] | dRU4<br>[-999:72:-567,-463:72:-31,81:72:441,545:72:977]<br>[-983:72:-551,-447:72:-87,25:72:457,561:72:993]<br>[-959:72:-599,-495:72:-63,41:72:473,577:72:937]<br>[-943:72:-583,-479:72:-47,65:72:425,529:72:961] |
| | dRU5<br>[-1009:72:-577,-473:72:-41,71:72:431,535:72:967]<br>[-993:72:-561,-457:72:-97,15:72:447,551:72:983]<br>[-969:72:-537,-433:72:-73,31:72:463,567:72:927]<br>[-953:72:-593,-489:72:-57,55:72:487,591:72:951] | dRU6<br>[-1001:72:-569,-465:72:-33,79:72:439,543:72:975]<br>[-985:72:-553,-449:72:-89,23:72:455,559:72:991]<br>[-961:72:-529,-425:72:-65,39:72:471,575:72:935]<br>[-945:72:-585,-481:72:-49,63:72:495,599:72:959] | dRU7<br>[-1005:72:-573,-469:72:-37,75:72:435,539:72:971]<br>[-989:72:-557,-453:72:-93,19:72:451,555:72:987]<br>[-965:72:-533,-429:72:-69,35:72:467,571:72:931]<br>[-949:72:-589,-485:72:-53,59:72:491,595:72:955] | dRU8<br>[-997:72:-565,-461:72:-29,83:72:443,547:72:979]<br>[-981:72:-549,-445:72:-85,27:72:459,563:72:995]<br>[-957:72:-597,-493:72:-61,43:72:475,579:72:939]<br>[-941:72:-581,-477:72:-45,67:72:427,531:72:963] |
| | dRU9<br>[-1010:72:-578,-474:72:-42,70:72:430,534:72:966]<br>[-994:72:-562,-458:72:-98,14:72:446,550:72:982]<br>[-970:72:-538,-434:72:-74,30:72:462,566:72:926]<br>[-954:72:-594,-490:72:-58,54:72:486,590:72:950] | dRU10<br>[-1002:72:-570,-466:72:-34,78:72:438,542:72:974]<br>[-986:72:-554,-450:72:-90,22:72:454,558:72:990]<br>[-962:72:-530,-426:72:-66,38:72:470,574:72:934]<br>[-946:72:-586,-482:72:-50,62:72:494,598:72:958] | dRU11<br>[-1006:72:-574,-470:72:-38,74:72:434,538:72:970]<br>[-990:72:-558,-454:72:-94,18:72:450,554:72:986]<br>[-966:72:-534,-430:72:-70,34:72:466,570:72:930]<br>[-950:72:-590,-486:72:-54,58:72:490,594:72:954] | dRU12<br>[-998:72:-566,-462:72:-30,82:72:442,546:72:978]<br>[-982:72:-550,-446:72:-86,26:72:458,562:72:994]<br>[-958:72:-598,-494:72:-62,42:72:474,578:72:938]<br>[-942:72:-582,-478:72:-46,66:72:426,530:72:962] |
| | dRU13<br>[-1008:72:-576,-472:72:-40,72:72:432,536:72:968]<br>[-992:72:-560,-456:72:-96,16:72:448,552:72:984]<br>[-968:72:-536,-432:72:-72,32:72:464,568:72:928]<br>[-952:72:-592,-488:72:-56,56:72:488,592:72:952] | dRU14<br>[-1000:72:-568,-464:72:-32,80:72:440,544:72:976]<br>[-984:72:-552,-448:72:-88,24:72:456,560:72:992]<br>[-960:72:-528,-424:72:-64,40:72:472,576:72:936]<br>[-944:72:-584,-480:72:-48,64:72:496,600:72:960] | dRU15<br>[-1004:72:-572,-468:72:-36,76:72:436,540:72:972]<br>[-988:72:-556,-452:72:-92,20:72:452,556:72:988]<br>[-964:72:-532,-428:72:-68,36:72:468,572:72:932]<br>[-948:72:-588,-484:72:-52,60:72:492,596:72:956] | dRU16<br>[-996:72:-564,-460:72:-28,84:72:444,548:72:980]<br>[-980:72:-548,-444:72:-84,28:72:460,564:72:996]<br>[-956:72:-596,-492:72:-60,44:72:476,580:72:940]<br>[-940:72:-580,-476:72:-44,68:72:428,532:72:964] |
| 242-tone dRU<br>i=1:8 | dRU1<br>[-1011:8:-531,-491:8:-19,13:8:493,533:8:1005] | dRU2<br>[-1007:8:-535,-495:8:-15,17:8:489,529:8:1009] | dRU3<br>[-1009:8:-529,-489:8:-17,15:8:495,535:8:1007] | dRU4<br>[-1005:8:-533,-493:8:-13,19:8:491,531:8:1011] |
| | dRU5<br>[-1010:8:-530,-490:8:-18,14:8:494,534:8:1006] | dRU6<br>[-1006:8:-534,-494:8:-14,18:8:490,530:8:1010] | dRU7<br>[-1008:8:-528,-488:8:-16,16:8:496,536:8:1008] | dRU8<br>[-1004:8:-532,-492:8:-12,20:8:492,532:8:1012] |
| 484-tone dRU<br>i=1:4 | dRU1<br>[-1011:4:-531,-495:4:-15,13:4:493,529:4:1009] | | dRU2<br>[-1009:4:-529,-493:4:-13,15:4:495,531:4:1011] | |
| | dRU3<br>[-1010:4:-530,-494:4:-14,14:4:494,530:4:1010] | | dRU4<br>[-1008:4:-528,-492:4:-12,16:4:496,532:4:1012] | |
| 996-tone dRU<br>i=1:2 | dRU1<br>[-1011:2:-515,-509:2:-13,13:2:509,515:2:1011] | | dRU2<br>[-1012:2:-516,-508:2:-12,12:2:508,516:2:1012] | |

Data and pilot subcarrier indices for Distributed Tone RUs (dRUs) in a 320 MHz PPDU

| | | | | |
|---|---|---|---|---|
| 484-tone dRU<br>i=1:8 | dRU1<br>[-2035:8:-1555,-1515:8:-1043,-1011:8:-531,-491:8:-19]<br>[13:8:493,533:8:1005,1037:8:1517,1557:8:2029] | dRU2<br>[-2031:8:-1559,-1519:8:-1039,-1007:8:-535,-495:8:-15]<br>[17:8:489,529:8:1009,1041:8:1513,1553:8:2033] | dRU3<br>[-2033:8:-1553,-1513:8:-1041,-1009:8:-529,-489:8:-17]<br>[15:8:495,535:8:1007,1039:8:1519,1559:8:2031] | dRU4<br>[-2029:8:-1557,-1517:8:-1037,-1005:8:-533,-493:8:-13]<br>[19:8:491,531:8:1011,1043:8:1515,1555:8:2035] |
| | dRU5<br>[-2034:8:-1554,-1514:8:-1042,-1010:8:-530,-490:8:-18]<br>[14:8:494,534:8:1006,1038:8:1518,1558:8:2030] | dRU6<br>[-2030:8:-1558,-1518:8:-1038,-1006:8:-534,-494:8:-14]<br>[18:8:490,530:8:1010,1042:8:1514,1554:8:2034] | dRU7<br>[-2032:8:-1552,-1512:8:-1040,-1008:8:-528,-488:8:-16]<br>[16:8:496,536:8:1008,1040:8:1520,1560:8:2032] | dRU8<br>[-2028:8:-1556,-1516:8:-1036,-1004:8:-532,-492:8:-12]<br>[20:8:492,532:8:1012,1044:8:1516,1556:8:2036] |
| 996-tone dRU<br>i=1:4 | dRU1<br>[-2035:4:-1539,-1531:4:-1039,-1011:4:-515,-507:4:-15]<br>[13:4:509,517:4:1009,1037:4:1533,1541:4:2033] | | dRU2<br>[-2033:4:-1541,-1533:4:-1037,-1009:4:-517,-509:4:-13]<br>[15:4:507,515:4:1011,1039:4:1531,1539:4:2035] | |
| | dRU3<br>[-2034:4:-1542,-1530:4:-1034,-1010:4:-518,-506:4:-10]<br>[10:4:506,518:4:1014,1038:4:1530,1542:4:2034] | | dRU4<br>[-2032:4:-1540,-1532:4:-1036,-1008:4:-516,-508:4:-12]<br>[12:4:508,516:4:1012,1040:4:1532,1544:4:2036] | |
| 2x996-tone dRU<br>i=1:2 | dRU1<br>[-2035:2:-1539,-1533:2:-1037,-1011:2:-515,-509:2:-13]<br>[13:2:509,515:2:1011,1037:2:1533,1539:2:2035] | | dRU2<br>[-2034:2:-1540,-1532:2:-1034,-1010:2:-516,-508:2:-10]<br>[10:2:508,516:2:1014,1038:2:1532,1542:2:2036] | |

| | | | | |
|---|---|---|---|---|
| 106-tone dRU i=1:24 | dRU1 [-1463:24:-1079,-999:24:-591,-463:24:-55] [49:24:457,585:24:969,1049:24:1457] | dRU2 [-1451:24:-1067,-987:24:-579,-451:24:-43] [61:24:469,597:24:981,1061:24:1469] | dRU3 [-1457:24:-1073,-993:24:-585,-457:24:-49] [55:24:463,591:24:975,1055:24:1463] | dRU4 [-1445:24:-1061,-981:24:-573,-445:24:-37] [67:24:475,603:24:987,1067:24:1475] |
| | dRU5 [-1460:24:-1076,-996:24:-588,-460:24:-52] [52:24:460,588:24:972,1052:24:1460] | dRU6 [-1448:24:-1064,-984:24:-576,-448:24:-40] [64:24:472,600:24:984,1064:24:1472] | dRU7 [-1454:24:-1070,-1002:24:-594,-454:24:-46] [58:24:466,594:24:978,1046:24:1454] | dRU8 [-1442:24:-1058,-990:24:-582,-442:24:-34] [70:24:478,606:24:990,1058:24:1466] |
| | dRU9 [-1462:24:-1078,-998:24:-590,-462:24:-54] [50:24:458,586:24:970,1050:24:1458] | dRU10 [-1450:24:-1066,-986:24:-578,-450:24:-42] [62:24:470,598:24:982,1062:24:1470] | dRU11 [-1456:24:-1072,-992:24:-584,-456:24:-48] [56:24:464,592:24:976,1056:24:1464] | dRU12 [-1444:24:-1060,-980:24:-572,-444:24:-36] [68:24:476,604:24:988,1068:24:1476] |
| | dRU13 [-1459:24:-1075,-995:24:-587,-459:24:-51] [53:24:461,589:24:973,1053:24:1461] | dRU14 [-1447:24:-1063,-983:24:-575,-447:24:-39] [65:24:473,601:24:985,1065:24:1473] | dRU15 [-1453:24:-1069,-1001:24:-593,-453:24:-45] [59:24:467,595:24:979,1047:24:1455] | dRU16 [-1441:24:-1057,-989:24:-581,-441:24:-33] [71:24:479,607:24:991,1059:24:1467] |
| | dRU17 [-1461:24:-1077,-997:24:-589,-461:24:-53] [51:24:459,587:24:971,1051:24:1459] | dRU18 [-1449:24:-1065,-985:24:-577,-449:24:-41] [63:24:471,599:24:983,1063:24:1471] | dRU19 [-1455:24:-1071,-1003:24:-595,-455:24:-47] [57:24:465,593:24:977,1045:24:1453] | dRU20 [-1443:24:-1059,-991:24:-583,-443:24:-35] [69:24:477,605:24:989,1057:24:1465] |
| | dRU21 [-1458:24:-1074,-994:24:-586,-458:24:-50] [54:24:462,590:24:974,1054:24:1462] | dRU22 [-1446:24:-1062,-982:24:-574,-446:24:-38] [66:24:474,602:24:986,1066:24:1474] | dRU23 [-1452:24:-1068,-1000:24:-592,-452:24:-44] [60:24:468,596:24:980,1048:24:1456] | dRU24 [-1440:24:-1056,-988:24:-580,-440:24:-32] [72:24:480,608:24:992,1060:24:1468] |
| 242-tone dRU i=1:12 | dRU1 [-1523:12:-1043,-999:12:-531,-499:12:-19] [25:12:481,525:12:1005,1049:12:1517] | dRU2 [-1517:12:-1049,-1005:12:-525,-493:12:-25] [19:12:487,531:12:999,1043:12:1523] | dRU3 [-1520:12:-1040,-996:12:-528,-496:12:-16] [28:12:484,528:12:1008,1052:12:1520] | dRU4 [-1514:12:-1034,-1002:12:-534,-490:12:-22] [22:12:490,534:12:1014,1046:12:1514] |
| | dRU5 [-1522:12:-1042,-998:12:-530,-498:12:-18] [26:12:482,526:12:1006,1050:12:1518] | dRU6 [-1516:12:-1048,-1004:12:-524,-492:12:-24] [20:12:488,532:12:1000,1044:12:1524] | dRU7 [-1519:12:-1051,-1007:12:-527,-495:12:-27] [17:12:485,529:12:997,1041:12:1521] | dRU8 [-1513:12:-1045,-1013:12:-533,-489:12:-21] [23:12:491,535:12:1003,1035:12:1515] |
| | dRU9 [-1521:12:-1041,-997:12:-529,-497:12:-17] [27:12:483,527:12:1007,1051:12:1519] | dRU10 [-1515:12:-1035,-1003:12:-535,-491:12:-23] [21:12:489,533:12:1013,1045:12:1513] | dRU11 [-1518:12:-1050,-1006:12:-526,-494:12:-26] [18:12:486,530:12:998,1042:12:1522] | dRU12 [-1512:12:-1044,-1012:12:-532,-488:12:-20] [24:12:492,536:12:1004,1036:12:1516] |
| 484-tone dRU i=1:6 | dRU1 [-1523:6:-1043,-1005:6:-525,-499:6:-19],[19 :6:487,525:6:1005,1043:6:1523] | | dRU2 [-1520:6:-1034,-1002:6:-528,-496:6:-16],[22 :6:490,528:6:1014,1046:6:1520] | |
| | dRU3 [-1522:6:-1042,-1004:6:-524,-498:6:-18],[20 :6:488,526:6:1006,1044:6:1524] | | dRU4 [-1519:6:-1045,-1013:6:-527,-495:5:-21],[17 :6:491,529:6:1003,1035:6:1521] | |
| | dRU5 [-1521:6:-1035,-1003:6:-529,-497:6:-17],[21 :6:489,527:6:1013,1045:6:1519] | | dRU6 [-1518:6:-1044,-1012:6:-526,-494:5:-20],[18 :6:492,530:6:1004,1036:6:1522] | |
| 996-tone dRU i=1:3 | dRU1 [-1523:3:-1028,-1020:3:-525,-499:3:-4],[4 :3:499,525:3:1020,1028:3:1523] | | dRU2 [-1522:3:-1027,-1019:3:-524,-498:3:-3],[5 :3:500,526:3:1021,1029:3:1524] | |
| | dRU3 [-1524:3:-1029,-1021:3:-526,-500:3:-5],[3 :3:498,524:3:1019,1027:3:1522] | | | |

| | | | | |
|---|---|---|---|---|
| 242-tone dRU<br>i=1:24 | dRU1<br>[-3059:24:-2579,-2523:24:-2067,-2023:24:-1567,-1511:24:-1055],<br>[-999:24:-543,-487:24:-31,13:24:493,549:24:1005],<br>[1049:24:1505,1561:24:2017,2073:24:2529,2585:24:3041] | dRU2<br>[-3047:24:-2591,-2535:24:-2079,-2035:24:-1555,-1499:24:-1067],<br>[-1011:24:-531,-475:24:-19,25:24:481,537:24:993],<br>[1037:24:1517,1573:24:2005,2061:24:2541,2597:24:3053] | dRU3<br>[-3053:24:-2597,-2541:24:-2061,-2017:24:-1561,-1505:24:-1049],<br>[-993:24:-537,-481:24:-25,19:24:475,531:24:1011],<br>[1055:24:1511,1567:24:2023,2079:24:2535,2591:24:3047] | dRU4<br>[-3041:24:-2585,-2529:24:-2073,-2029:24:-1573,-1517:24:-1061],<br>[-1005:24:-549,-493:24:-13,31:24:487,543:24:999],<br>[1043:24:1499,1555:24:2011,2067:24:2523,2579:24:3059] |
| | dRU5<br>[-3056:24:-2576,-2520:24:-2064,-2020:24:-1564,-1508:24:-1052],<br>[-996:24:-540,-484:24:-28,16:24:496,552:24:1008],<br>[1052:24:1508,1564:24:2020,2076:24:2532,2588:24:3044] | dRU6<br>[-3044:24:-2588,-2532:24:-2076,-2032:24:-1552,-1496:24:-1064],<br>[-1008:24:-528,-472:24:-16,28:24:484,540:24:996],<br>[1040:24:1520,1576:24:2008,2064:24:2544,2600:24:3056] | dRU7<br>[-3050:24:-2570,-2526:24:-2070,-2014:24:-1558,-1502:24:-1046],<br>[-990:24:-534,-490:24:-34,22:24:502,546:24:1002],<br>[1058:24:1514,1570:24:2026,2082:24:2538,2582:24:3038] | dRU8<br>[-3038:24:-2582,-2538:24:-2082,-2026:24:-1570,-1514:24:-1058],<br>[-1002:24:-522,-478:24:-22,34:24:490,534:24:990],<br>[1046:24:1502,1558:24:2014,2070:24:2550,2594:24:3050] |
| | dRU9<br>[-3058:24:-2578,-2522:24:-2066,-2022:24:-1566,-1510:24:-1054],<br>[-998:24:-542,-486:24:-30,14:24:494,550:24:1006],<br>[1050:24:1506,1562:24:2018,2074:24:2530,2586:24:3042] | dRU10<br>[-3046:24:-2590,-2534:24:-2078,-2034:24:-1554,-1498:24:-1066],<br>[-1010:24:-530,-474:24:-18,26:24:482,538:24:994],<br>[1038:24:1518,1574:24:2006,2062:24:2542,2598:24:3054] | dRU11<br>[-3052:24:-2596,-2540:24:-2060,-2016:24:-1560,-1504:24:-1048],<br>[-992:24:-536,-480:24:-24,20:24:476,532:24:1012],<br>[1056:24:1512,1568:24:2024,2080:24:2536,2592:24:3048] | dRU12<br>[-3040:24:-2584,-2528:24:-2072,-2028:24:-1572,-1516:24:-1060],<br>[-1004:24:-548,-492:24:-12,32:24:488,544:24:1000],<br>[1044:24:1500,1556:24:2012,2068:24:2524,2580:24:3060] |
| | dRU13<br>[-3055:24:-2599,-2543:24:-2063,-2019:24:-1563,-1507:24:-1051],<br>[-995:24:-539,-483:24:-27,17:24:473,529:24:1009],<br>[1053:24:1509,1565:24:2021,2077:24:2533,2589:24:3045] | dRU14<br>[-3043:24:-2587,-2531:24:-2075,-2031:24:-1575,-1519:24:-1063],<br>[-1007:24:-551,-495:24:-15,29:24:485,541:24:997],<br>[1041:24:1497,1553:24:2009,2065:24:2521,2577:24:3057] | dRU15<br>[-3049:24:-2593,-2549:24:-2069,-2013:24:-1557,-1501:24:-1045],<br>[-989:24:-533,-489:24:-33,23:24:479,523:24:1003],<br>[1059:24:1515,1571:24:2027,2083:24:2539,2583:24:3039] | dRU16<br>[-3037:24:-2581,-2537:24:-2081,-2025:24:-1569,-1513:24:-1057],<br>[-1001:24:-545,-501:24:-21,35:24:491,535:24:991],<br>[1047:24:1503,1559:24:2015,2071:24:2527,2571:24:3051] |
| | dRU17<br>[-3057:24:-2577,-2521:24:-2065,-2021:24:-1565,-1509:24:-1053],<br>[-997:24:-541,-485:24:-29,15:24:495,551:24:1007],<br>[1051:24:1507,1563:24:2019,2075:24:2531,2587:24:3043] | dRU18<br>[-3045:24:-2589,-2533:24:-2077,-2033:24:-1553,-1497:24:-1065],<br>[-1009:24:-529,-473:24:-17,27:24:483,539:24:995],<br>[1039:24:1519,1575:24:2007,2063:24:2543,2599:24:3055] | dRU19<br>[-3051:24:-2571,-2527:24:-2071,-2015:24:-1559,-1503:24:-1047],<br>[-991:24:-535,-491:24:-35,21:24:501,545:24:1001],<br>[1057:24:1513,1569:24:2025,2081:24:2537,2581:24:3037] | dRU20<br>[-3039:24:-2583,-2539:24:-2083,-2027:24:-1571,-1515:24:-1059],<br>[-1003:24:-523,-479:24:-23,33:24:489,533:24:989],<br>[1045:24:1501,1557:24:2013,2069:24:2549,2593:24:3049] |
| | dRU21<br>[-3054:24:-2598,-2542:24:-2062,-2018:24:-1562,-1506:24:-1050],<br>[-994:24:-538,-482:24:-26,18:24:474,530:24:1010],<br>[1054:24:1510,1566:24:2022,2078:24:2534,2590:24:3046] | dRU22<br>[-3042:24:-2586,-2530:24:-2074,-2030:24:-1574,-1518:24:-1062],<br>[-1006:24:-550,-494:24:-14,30:24:486,542:24:998],<br>[1042:24:1498,1554:24:2010,2066:24:2522,2578:24:3058] | dRU23<br>[-3048:24:-2592,-2548:24:-2068,-2012:24:-1556,-1500:24:-1044],<br>[-988:24:-532,-488:24:-32,24:24:480,524:24:1004],<br>[1060:24:1516,1572:24:2028,2084:24:2540,2584:24:3040] | dRU24<br>[-3036:24:-2580,-2536:24:-2080,-2024:24:-1568,-1512:24:-1056],<br>[-1000:24:-544,-500:24:-20,36:24:492,536:24:992],<br>[1048:24:1504,1560:24:2016,2072:24:2528,2572:24:3052] |

| | | | | |
|---|---|---|---|---|
| 484-tone dRU<br>i=1:12 | dRU1<br>[-3059:12:-2579,-2535:12:-2067,-2035:12:-1555,-1511:12:-1055],<br>[-1011:12:-531,-487:12:-19,13:12:493,537:12:1005],<br>[1037:12:1517,1561:12:2017,2061:12:2541,2585:12:3053] | dRU2<br>[-3053:12:-2585,-2541:12:-2061,-2029:12:-1561,-1517:12:-1049],<br>[-1005:12:-537,-493:12:-13,19:12:487,531:12:1011],<br>[1043:12:1511,1555:12:2023,2067:12:2535,2579:12:3059] | dRU3<br>[-3056:12:-2576,-2532:12:-2064,-2032:12:-1552,-1508:12:-1052],<br>[-1008:12:-528,-484:12:-16,16:12:496,540:12:1008],<br>[1040:12:1520,1564:12:2020,2064:12:2544,2588:12:3056] | dRU4<br>[-3050:12:-2570,-2538:12:-2070,-2026:12:-1558,-1514:12:-1046],<br>[-1002:12:-522,-490:12:-22,22:12:502,534:12:1002],<br>[1046:12:1514,1558:12:2026,2070:12:2550,2582:12:3050] |
| | dRU5<br>[-3058:12:-2578,-2534:12:-2066,-2034:12:-1554,-1510:12:-1054],<br>[-1010:12:-530,-486:12:-18,14:12:494,538:12:1006],<br>[1038:12:1518,1562:12:2018,2062:12:2542,2586:12:3054] | dRU6<br>[-3052:12:-2584,-2540:12:-2060,-2028:12:-1560,-1516:12:-1048],<br>[-1004:12:-536,-492:12:-12,20:12:488,532:12:1012],<br>[1044:12:1512,1556:12:2024,2068:12:2536,2580:12:3060] | dRU7<br>[-3055:12:-2587,-2543:12:-2063,-2031:12:-1563,-1519:12:-1051],<br>[-1007:12:-539,-495:12:-15,17:12:485,529:12:1009],<br>[1041:12:1509,1553:12:2021,2065:12:2533,2577:12:3057] | dRU8<br>[-3049:12:-2581,-2549:12:-2069,-2025:12:-1557,-1513:12:-1045],<br>[-1001:12:-533,-501:12:-21,23:12:491,523:12:1003],<br>[1047:12:1515,1559:12:2027,2071:12:2539,2571:12:3051] |
| | dRU9<br>[-3057:12:-2577,-2533:12:-2065,-2033:12:-1553,-1509:12:-1053],<br>[-1009:12:-529,-485:12:-17,15:12:495,539:12:1007],<br>[1039:12:1519,1563:12:2019,2063:12:2543,2587:12:3055] | dRU10<br>[-3051:12:-2571,-2539:12:-2071,-2027:12:-1559,-1515:12:-1047],<br>[-1003:12:-523,-491:12:-23,21:12:501,533:12:1001],<br>[1045:12:1513,1557:12:2025,2069:12:2549,2581:12:3049] | dRU11<br>[-3054:12:-2586,-2542:12:-2062,-2030:12:-1562,-1518:12:-1050],<br>[-1006:12:-538,-494:12:-14,18:12:486,530:12:1010],<br>[1042:12:1510,1554:12:2022,2066:12:2534,2578:12:3058] | dRU12<br>[-3048:12:-2580,-2548:12:-2068,-2024:12:-1556,-1512:12:-1044],<br>[-1000:12:-532,-500:12:-20,24:12:492,524:12:1004],<br>[1048:12:1516,1560:12:2028,2072:12:2540,2572:12:3052] |
| 996-tone dRU<br>i=1:6 | dRU1<br>[-3059:6:-2567,-2553:6:-2061,-2035:6:-1543,-1529:6:-1043],<br>[-1017:6:-519,-505:6:-13,13:6:505,519:6:1011],<br>[1037:6:1529,1543:6:2029,2055:6:2553,2567:6:3059] | | dRU2<br>[-3056:6:-2564,-2556:6:-2064,-2032:6:-1540,-1532:6:-1046],<br>[-1014:6:-516,-508:6:-16,16:6:508,516:6:1008],<br>[1040:6:1532,1540:6:2026,2058:6:2556,2564:6:3056] | |
| | dRU3<br>[-3058:6:-2566,-2552:6:-2060,-2034:6:-1542,-1528:6:-1036],<br>[-1010:6:-518,-504:6:-12,14:6:506,520:6:1012],<br>[1038:6:1530,1544:6:2036,2062:6:2554,2568:6:3060] | | dRU4<br>[-3055:6:-2563,-2555:6:-2063,-2031:6:-1539,-1531:6:-1039],<br>[-1007:6:-515,-507:6:-15,17:6:509,517:6:1009],<br>[1041:6:1533,1541:6:2033,2065:6:2557,2565:6:3057] | |
| | dRU5<br>[-3057:6:-2565,-2557:6:-2065,-2033:6:-1541,-1533:6:-1041],<br>[-1009:6:-517,-509:6:-17,15:6:507,515:6:1007],<br>[1039:6:1531,1539:6:2031,2063:6:2555,2563:6:3055] | | dRU6<br>[-3060:6:-2568,-2554:6:-2062,-2036:6:-1544,-1530:6:-1038],<br>[-1012:6:-520,-506:6:-14,12:6:504,518:6:1010],<br>[1036:6:1528,1542:6:2034,2060:6:2552,2566:6:3058] | |
| 2x996-tone dRU<br>i=1:3 | dRU1<br>[-3059:3:-2564,-2556:3:-2061,-2035:3:-1540,-1532:3:-1043],<br>[-1017:3:-516,-508:3:-13,13:3:508,516:3:1011],<br>[1037:3:1532,1540:3:2029,2055:3:2556,2564:3:3059] | | dRU2<br>[-3058:3:-2563,-2555:3:-2060,-2034:3:-1539,-1531:3:-1036],<br>[-1010:3:-515,-507:3:-12,14:3:509,517:3:1012],<br>[1038:3:1533,1541:3:2036,2062:3:2557,2565:3:3060] | |
| | dRU3<br>[-3060:3:-2565,-2557:3:-2062,-2036:3:-1541,-1533:3:-1038],<br>[-1012:3:-517,-509:3:-14,12:3:507,515:3:1010],<br>[1036:3:1531,1539:3:2034,2060:3:2555,2563:3:3058] | | | |

Figure 21:
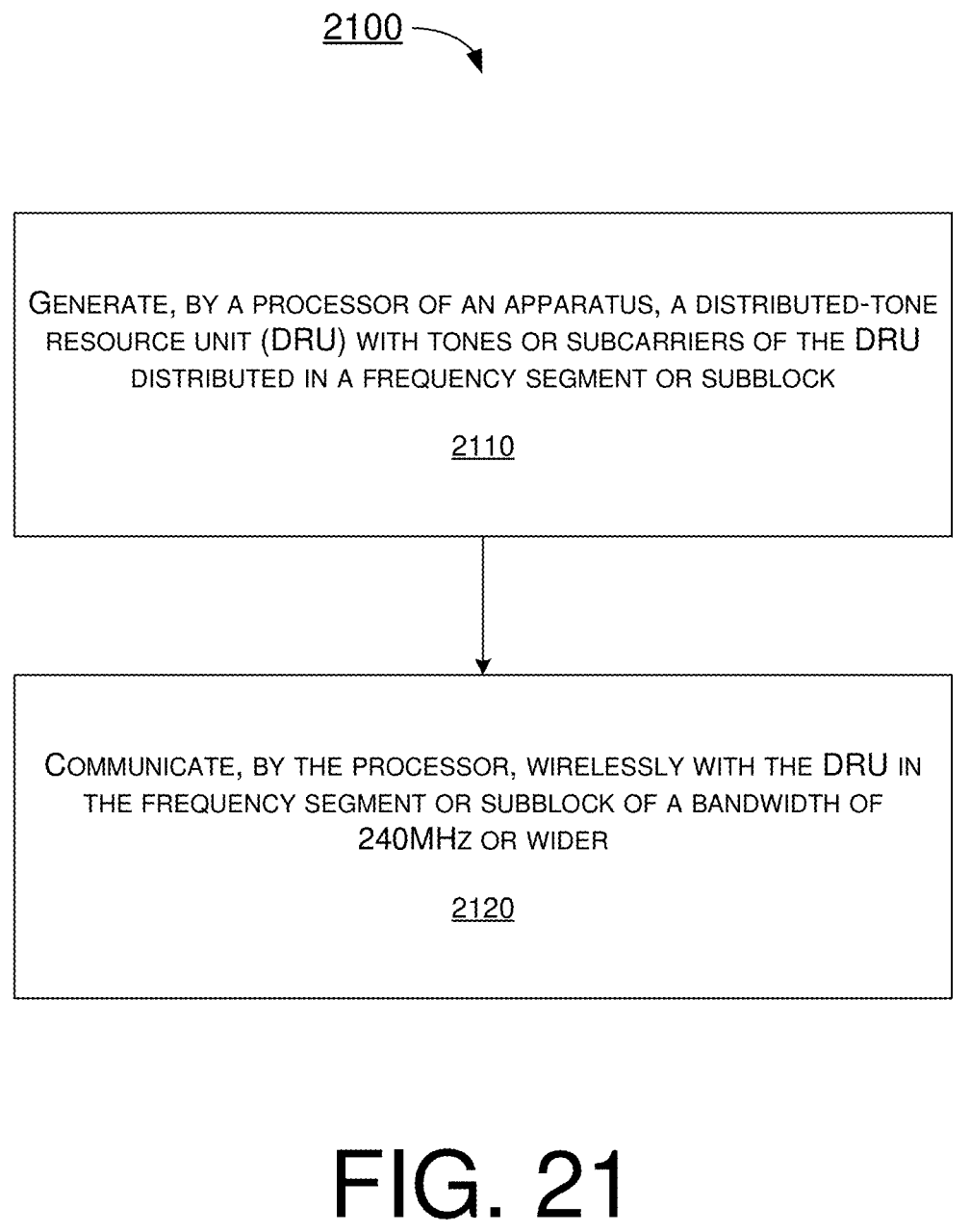

2100

GENERATE, BY A PROCESSOR OF AN APPARATUS, A DISTRIBUTED-TONE RESOURCE UNIT (DRU) WITH TONES OR SUBCARRIERS OF THE DRU DISTRIBUTED IN A FREQUENCY SEGMENT OR SUBBLOCK

2110

COMMUNICATE, BY THE PROCESSOR, WIRELESSLY WITH THE DRU IN THE FREQUENCY SEGMENT OR SUBBLOCK OF A BANDWIDTH OF 240MHZ OR WIDER

DISTRIBUTED-TONE RESOURCE UNIT TRANSMISSION ON FREQUENCY SUBBLOCK OF WIDE BANDWIDTH IN WIRELESS COMMUNICATIONS

CROSS REFERENCE TO RELATED PATENT APPLICATION(S)

The present disclosure is part of a non-provisional patent application claiming the priority benefit of U.S. Provisional Patent Application No. 63/500,299, filed 5 May 2023, the content of which herein being incorporated by reference in its entirety.

TECHNICAL FIELD

The present disclosure is generally related to wireless communications and, more particularly, to distributed-tone resource unit (DRU or dRU) transmission of frequency subblocks or frequency segments of wide bandwidths in wireless communications.

BACKGROUND

Unless otherwise indicated herein, approaches described in this section are not prior art to the claims listed below and are not admitted as prior art by inclusion in this section.

In wireless communications such as Wi-Fi (or WiFi) in accordance with the Institute of Electrical and Electronics Engineers (IEEE) 802.11 standards, DRUs are utilized to distribute tones (e.g., data subcarriers) over a distribution bandwidth such as 20 MHz, 40 MHz, 80 MHz, 160 MHz, 240 MHz, 320 MHz or 480 MHz to boost transmit power to improve the coverage range in a 6 GHz low-power indoor (LPI) system. Among the different operation modes with respect to DRUs, some operation modes (e.g., hybrid mode with regular resource unit (RRU or rRU) on one frequency segment and DRU on other frequency segments, and the like) require tone distribution to be performed on only certain frequency segments or frequency subblocks of a given bandwidth instead of the entire distribution bandwidth. For example, DRUs may be distributed within an 80 MHz or 160 MHz frequency segment or frequency subblock of a wider bandwidth of 240 MHz, 320 MHz, 480 MHz or 640 MHz. At the time of the present invention, how to transmit DRUs on a frequency segment or frequency subblock of a wider system bandwidth, such as 240 MHz, 320 MHz, 480 MHz or 640 MHz, has yet to be defined. Therefore, there is a need for a solution of DRU transmission of frequency subblocks or frequency segments of wide bandwidths in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to DRU transmission of frequency subblocks or frequency segments of wide bandwidths in wireless communications. Under various proposed schemes in accordance with the present disclosure, mixed-distribution bandwidth operations may be enabled with DRU resource assignment and scheduling described herein. For instance, implementation of one or more of the schemes proposed herein may enable DRU transmission on a frequency subblock of a wider system bandwidth such as: (a) DRU on a 20 MHz segment of a 240 MHz/480 MHz/640 MHz system bandwidth; (b) DRU on a 40 MHz segment of a 240 MHz/480 MHz/640 MHz system bandwidth; (c) DRU on an 80 MHz segment of a 240 MHz/480 MHz/640 MHz system bandwidth; (d) DRU on a 160 MHz segment of a 240 MHz/320 MHz/480 MHz/640 MHz system bandwidth; (e) DRU on a 240 MHz segment of a 320 MHz/480 MHz/640 MHz system bandwidth; (f) DRU on a 320 MHz segment of a 480 MHz/640 MHz system bandwidth; and (g) DRU on a 480 MHz segment of a 640 MHz system bandwidth. It is believed that implementations of one or more of the proposed schemes may address or otherwise alleviate the aforementioned issue(s).

In one aspect, a method may involve a processor of an apparatus generating a DRU with tones or subcarriers of the DRU distributed in a frequency segment or subblock. The method may also involve the processor communicating wirelessly with the DRU in the frequency segment or subblock of a bandwidth of 240 MHz or wider.

In another aspect, an apparatus may include a transceiver configured to communicate wirelessly and a processor coupled to the transceiver. The processor may generate a DRU with tones or subcarriers of the DRU distributed in a frequency segment or subblock. The processor may also communicate wirelessly with the DRU in the frequency segment or subblock of a bandwidth of 240 MHz or wider.

It is noteworthy that, although description provided herein may be in the context of certain radio access technologies, networks and network topologies such as, Wi-Fi/WLAN, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example scenario under a proposed scheme in accordance with the present disclosure.

FIG. 11 is a diagram of an example design under a proposed scheme in accordance with the present disclosure.

FIG. 14 is a diagram of an example design under a proposed scheme in accordance with the present disclosure.

FIG. 15 is a diagram of an example design under a proposed scheme in accordance with the present disclosure.

FIG. 17 is a diagram of an example design under a proposed scheme in accordance with the present disclosure.

FIG. 18 is a diagram of an example design under a proposed scheme in accordance with the present disclosure.

FIG. 21 is a flowchart of an example process in accordance with an implementation of the present disclosure.

DETAILED DESCRIPTION OF PREFERRED EMBODIMENTS

Figure 1:
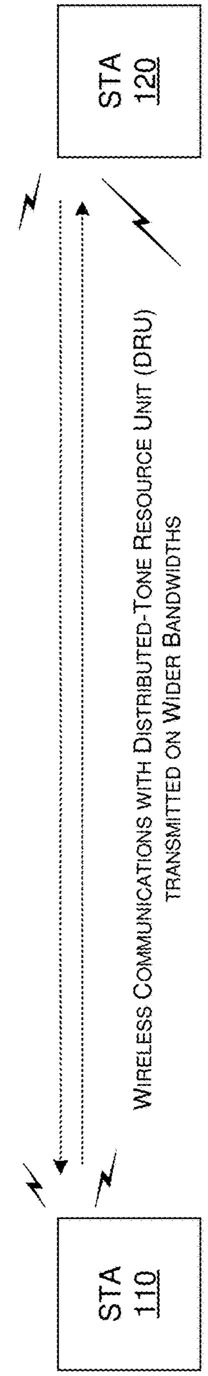
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to DRU transmission of frequency subblocks or frequency segments of wide bandwidths in wireless communications. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular (non-distributed) RU (RRU) refers to a RU with tones that are continuous (e.g., adjacent to one another) and not interleaved, interlaced or otherwise distributed. Moreover, a 26-tone regular RU may be interchangeably denoted as RU26 (or RRU26), a 52-tone regular RU may be interchangeably denoted as RU52 (or RRU52), a 106-tone regular RU may be interchangeably denoted as RU106 (or RRU106), a 242-tone regular RU may be interchangeably denoted as RU242 (or RRU242), and so on. Moreover, a 26-tone distributed-tone RU may be interchangeably denoted as DRU26 (or iRU26, or dRU26), a 52-tone distributed-tone RU may be interchangeably denoted as DRU52 (or iRU52, or dRU52), a 106-tone distributed-tone RU may be interchangeably denoted as DRU106 (or iRU106, or dRU106), a 242-tone distributed-tone RU may be interchangeably denoted as DRU242 (or iRU242, or dRU242), and so on. Moreover, an aggregate (26+52)-tone regular multi-RU (MRU) may be interchangeably denoted as MRU78 (or rMRU78, or RMRU78), an aggregate (26+106)-tone regular MRU may be interchangeably denoted as MRU132 (or rMRU132, or RMRU132), and so on. Furthermore, an aggregate (26+52)-tone distributed-tone MRU (DMRU or dMRU) may be interchangeably denoted as DMRU132 (or dMRU132), and so on.

It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, a bandwidth of 320 MHz may be interchangeably denoted as BW320 or BW320M, a bandwidth of 480 MHz may be interchangeably denoted as BW480 or BW480M, a bandwidth of 500 MHz may be interchangeably denoted as BW500 or BW500M, a bandwidth of 520 MHz may be interchangeably denoted as BW520 or BW520M, a bandwidth of 540 MHz may be interchangeably denoted as BW540 or BW540M, a bandwidth of 640 MHz may be interchangeably denoted as BW640 or BW640M.

FIG. 1 illustrates an example network environment 100 in which various solutions and schemes in accordance with the present disclosure may be implemented. FIG. 2~FIG. 21 illustrate examples of implementation of various proposed schemes in network environment 100 in accordance with the present disclosure. The following description of various proposed schemes is provided with reference to FIG. 1~FIG. 21.

Referring to FIG. 1, network environment 100 may involve at least a STA 110 communicating wirelessly with a STA 120. Either of STA 110 and STA 120 may be an access point (AP) STA or, alternatively, either of STA 110 and STA 120 may function as a non-AP STA. In some cases, STA 110 and STA 120 may be associated with a basic service set (BSS) in accordance with one or more IEEE 802.11 standards (e.g., IEEE 802.11 be and future-developed standards). Each of STA 110 and STA 120 may be configured to communicate with each other by utilizing the various proposed schemes of DRU transmission of frequency subblocks or frequency segments of wide bandwidths in wireless communications in accordance with various proposed schemes described below. That is, either or both of STA 110 and STA 120 may function as a "user" in the proposed schemes and examples described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

Under current IEEE 802.11 specifications, distribution of DRU of any size onto any frequency frequency/subblock (with a size of 20 MHz, 40 MHz or 80 MHz) of a wider system bandwidth (of a size of 80 MHz, 160 MHz or 320 MHz) can be simply generated as:

$$K_{DRU\_i} = k_{DRU} + K_{shift}(i)$$

Here, $K_{DRU}$ denotes DRU subcarrier indices from a DRU tone table for a DRU on BW20/40/80; $K_{DRU\_i}$, denotes DRU subcarrier indices on the $i^{th}$ frequency subblock; $K_{shift}(i)$ denotes a constant shift value defined in the table shown in FIG. 2; and i denotes a frequency subblock index of a subblock size BW20/40/80 on BW80/160/320. It is noteworthy that $K_{shift}(i)$=120+K1st for subblock size 20 MHz or 244+K1st for subblock size 40 MHz or 500+K1st for subblock size 80 MHz, with K1st being the starting (or first) tone index of a corresponding frequency subblock i of subblock size 20 MHz, 40 MHz or 80 MHz. FIG. 2 illustrates an example scenario 200 of $K_{shift}$ for a one-step option.

In the User Info field of IEEE 802.11 be trigger frame (shown in FIG. **9-64*f*1, Table 9.29j1 and Table 9.29j2 of the IEEE 802.11be specification), bits B7-B1 of RU Allocation subfield define the RU size and location in 80 MHz. The bit of PS160 and the bit BC of RU Allocation together define the 80 MHz frequency subblock index N for BW80/160/320. It is easy to convert or map B7-B1 of the RU Allocation subfield to 20/40 MHz frequency subblock index as defined in the table shown in FIG. 3**.

Figure 3:
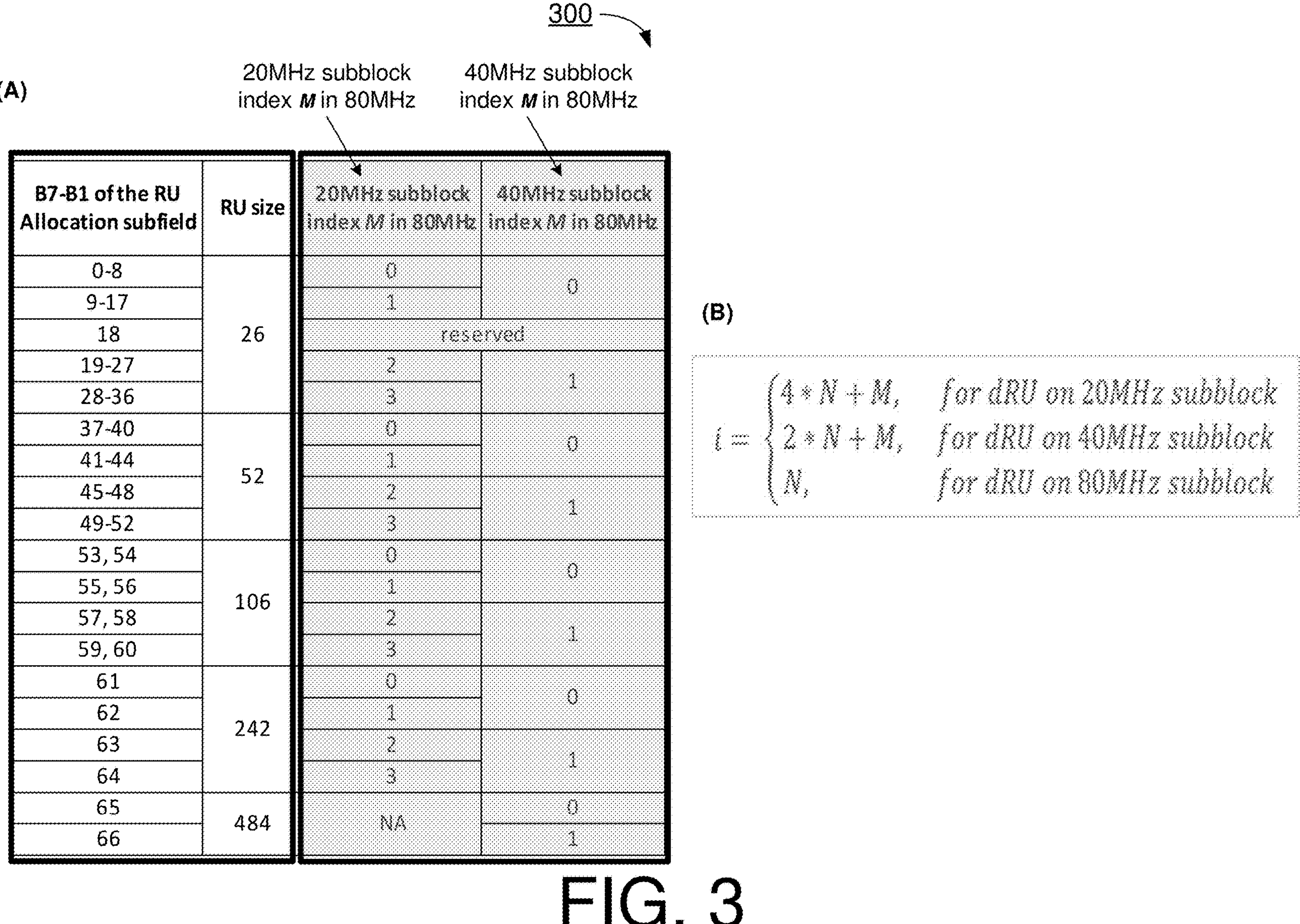
FIG. 3 is a diagram of an example scenario under a proposed scheme in accordance with the present disclosure.

FIG. 3 illustrates an example scenario 300 of frequency subblock index. Referring to the table shown in part (A) of FIG. 3, according to B7-B1 of the RU Allocation subfield, the 20/40 MHz frequency subblock index M inside 80 MHz is defined. The global subblock index i in BW80/160/320 can be calculated as shown in part (B) of FIG. 3. It is noteworthy that index i, M, N may be assumed to start from 0.

Under various proposed schemes in accordance with the present disclosure, DRU transmission may be performed for tone distributions on a frequency segment/subblock of a wider system bandwidth. Under the proposed schemes, a DRU may be distributed and transmitted on: (a) a 20 MHz frequency segment/subblock of a 240 MHz, 480 MHz or 640 MHz system bandwidth; (b) a 40 MHz frequency segment/subblock of a 240 MHz, 480 MHz or 640 MHz system bandwidth; (c) an 80 MHz frequency segment/subblock of a 240 MHz, 480 MHz or 640 MHz system bandwidth; (d) a 160 MHz frequency segment/subblock of a 240 MHz, 320 MHz, 480 MHz or 640 MHz system bandwidth; (e) a 240 MHz frequency segment/subblock of a 320 MHz, 480 MHz or 640 MHz system bandwidth; (f) a 320 MHz frequency segment/subblock of a 480 MHz or 640 MHz system bandwidth; and (g) a 480 MHz frequency segment/subblock of a 640 MHz system bandwidth.

Under the proposed schemes, a DRU of any size may be distributed onto and transmitted on any frequency segment/subblock with a size of 20 MHz, 40 MHz, 80 MHz, 160 MHz, 240 MHz, 320 MHz or 480 MHz of a wider system bandwidth of 80 MHz, 160 MHz, 320 MHz, 240 MHz, 480 MHz or 640 MHz may be generated using the expression of $K_{DRU\_i}$=$k_{DRU}$+$K_{shift}(i)$. Here, $K_{DRU}$ denotes DRU subcarrier indices from a DRU tone table (shown in FIG. 11) for a DRU on BW20/40/80/160/240/320/480; $K_{DRU\_i}$ denotes DRU subcarrier indices on the $i^{th}$ frequency subblock; $K_{shift}$ (i) denotes a constant shift value corresponding to the $i^{th}$ frequency segment or subblock and is defined in the table shown in FIG. 11; and i denotes a frequency subblock index of a subblock size BW20/40/80/160/240/320/480 on BW80/160/240/320/480/640. It is noteworthy that $K_{shift}(i)$=120+K1st for subblock size 20 MHz or 244+K1st for subblock size 40 MHz or 500+K1st for subblock size 80 MHz or 1012+K1st for subblock size 160 MHz or 1524+K1st for subblock size 240 MHz or 2036+K1st for subblock size 320 MHz or 3060+K1st for subblock size 480 MHz, with K1st being the starting (or first) tone index of a corresponding frequency subblock i of subblock size 20 MHz, 40 MHz, 80 MHz, 160 MHz, 240 MHz, 320 MHz or 480 MHz.

Figure 4:
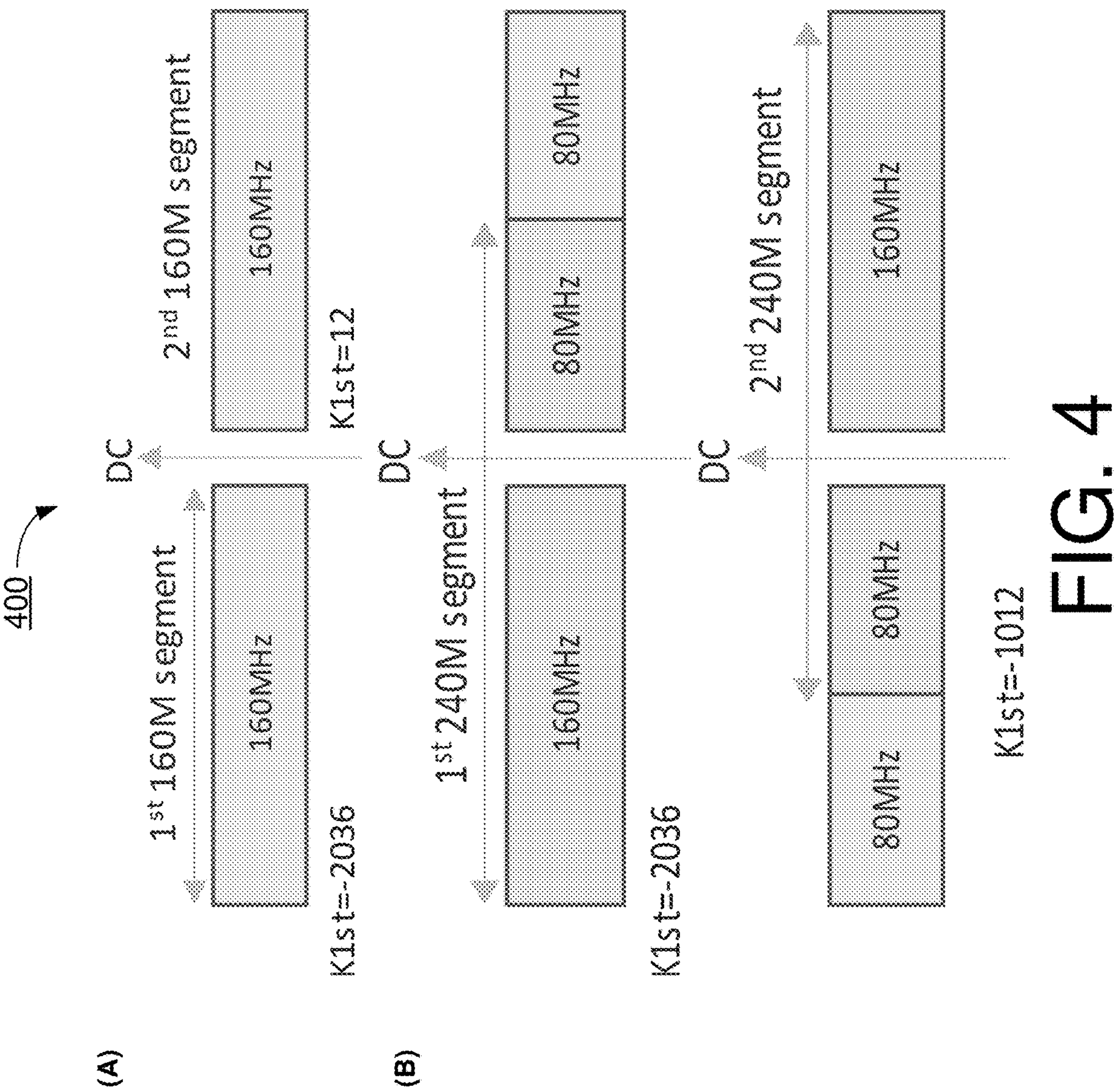
FIG. 4 is a diagram of an example scenario under a proposed scheme in accordance with the present disclosure.

FIG. 4 illustrates an example scenario 400 under a proposed scheme in accordance with the present disclosure. Scenario 400 may pertain to examples showing values of the K1st index of a distribution frequency segment/subblock in a wider system bandwidth of 320 MHz. Referring to part (A) of FIG. 4, with a 160 MHz frequency segment/subblock for DRU distribution and transmission in a 320 MHz system bandwidth, the 160 MHz frequency segment/subblock may be in either the lower half or the upper half of the 320 MHz. When the DRU is distributed and transmitted on a first 160 MHz frequency segment/subblock in the lower half of the 320 MHz, K1st=2036. When the DRU is distributed and transmitted on a second 160 MHz frequency segment/subblock in the upper half of the 320 MHz, K1st=12.

Referring to part (B) of FIG. 4, with a 240 MHz frequency segment/subblock for DRU distribution and transmission in a 320 MHz system bandwidth, one portion of the 240 MHz frequency segment/subblock may be in both of the lower half and the upper half of the 320 MHz with the other portion of the 240 MHz frequency segment/subblock in either of the lower half and the upper half of the 320 MHz. When a first 160 MHz frequency segment/subblock in the lower half of the 320 MHz is fully utilized for the DRU distribution and transmission, K1st=2036. When a second 160 MHz frequency segment/subblock in the upper half of the 320 MHz is fully utilized for the DRU distribution and transmission, K1st=1012.

Figure 5:
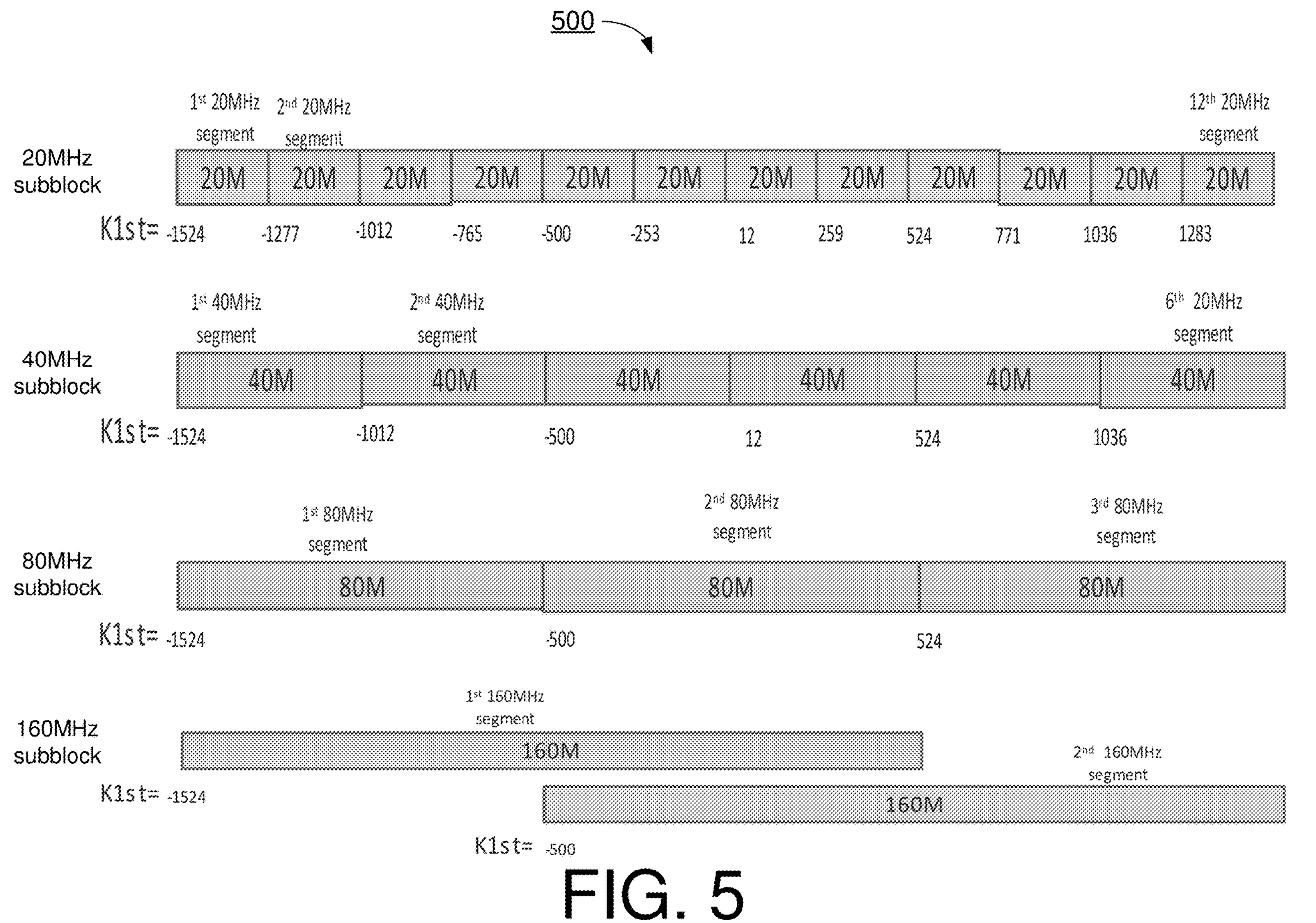
FIG. 5 is a diagram of an example scenario under a proposed scheme in accordance with the present disclosure.

FIG. 5 illustrates an example scenario 500 under a proposed scheme in accordance with the present disclosure. Scenario 500 may pertain to examples showing values of the K1st index of a distribution frequency segment/subblock in a wider system bandwidth of 240 MHz. Under the proposed scheme, in case that BW240 is by puncturing 80 MHz from BW320, then K1st for different distribution frequency segments/subblocks may be the same as with a wider system bandwidth of 320 MHz. On the other hand, in case that BW240 has direct-current (DC) tones in the middle instead of being 80 MHz-punctured from a 320 MHz bandwidth, then K1st may be defined as shown in FIG. 5. Referring to FIG. 5, the K1st index value for each 20 MHz frequency segment/subblock in 240 MHz may be one of K1st=[−1524 −1277 −1012 −765 −500 −253 12 259 524 771 1036 1283]. Additionally, the K1st index value for each 40 MHz frequency segment/subblock in 240 MHz may be one of K1st=[−1524 −1012 −500 12 524 1036]. Moreover, the K1st index value for each 80 MHz frequency segment/subblock in 240 MHz may be one of K1st=[−1524 −500 524]. Furthermore, the K1st index value for each 160 MHz frequency segment/subblock in 240 MHz may be one of K1st=[−1524 −500].

Figure 6:
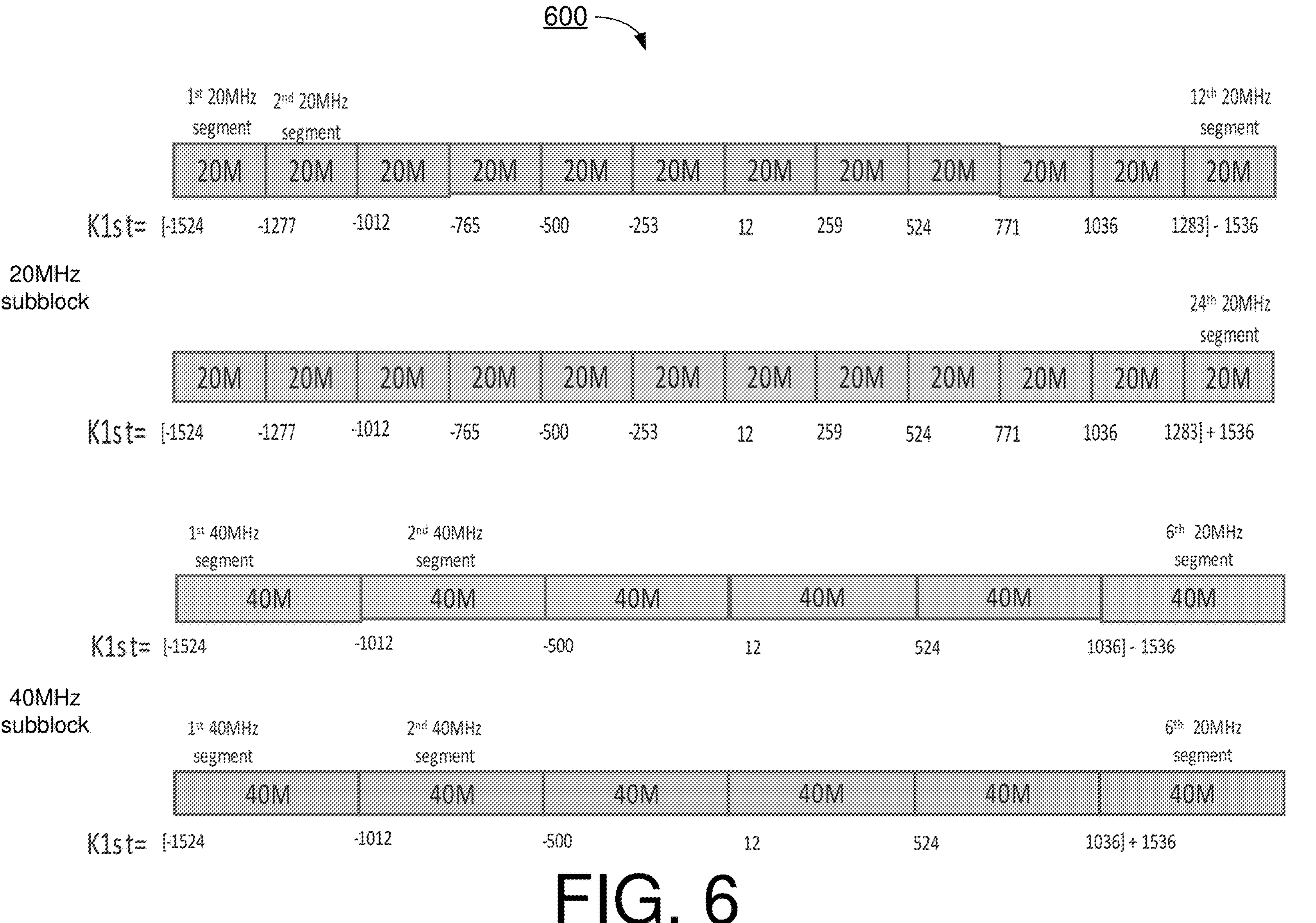
FIG. 6 is a diagram of an example scenario under a proposed scheme in accordance with the present disclosure.

FIG. 6 illustrates an example scenario 600 under a proposed scheme in accordance with the present disclosure. Scenario 600 may pertain to examples showing values of the K1st index of a distribution frequency segment/subblock in a wider system bandwidth of 480 MHz. Referring to FIG. 6, the K1st index value for each 20 MHz frequency segment/subblock in a lower 240 MHz half of the 480 MHz may be one of K1st=[−1524 −1277 −1012 −765 −500 −253 12 259 524 771 1036 1283]−1536, and the K1st index value for each 20 MHz frequency segment/subblock in an upper 240 MHz half of the 480 MHz may be one of K1st=[−1524 −1277 −1012 −765 −500 −253 12 259 524 771 1036 1283]+1536. Moreover, the K1st index value for each 40 MHz frequency segment/subblock in the lower 240 MHz half of the 480 MHz may be one of K1st=[−1524 −1012 −500 12 524 1036]−1536, and the K1st index value for each 40 MHz frequency segment/subblock in the lower 240 MHz half of the 480 MHz may be one of K1st=[−1524 −1012 −500 12 524 1036]+1536.

Figure 7:
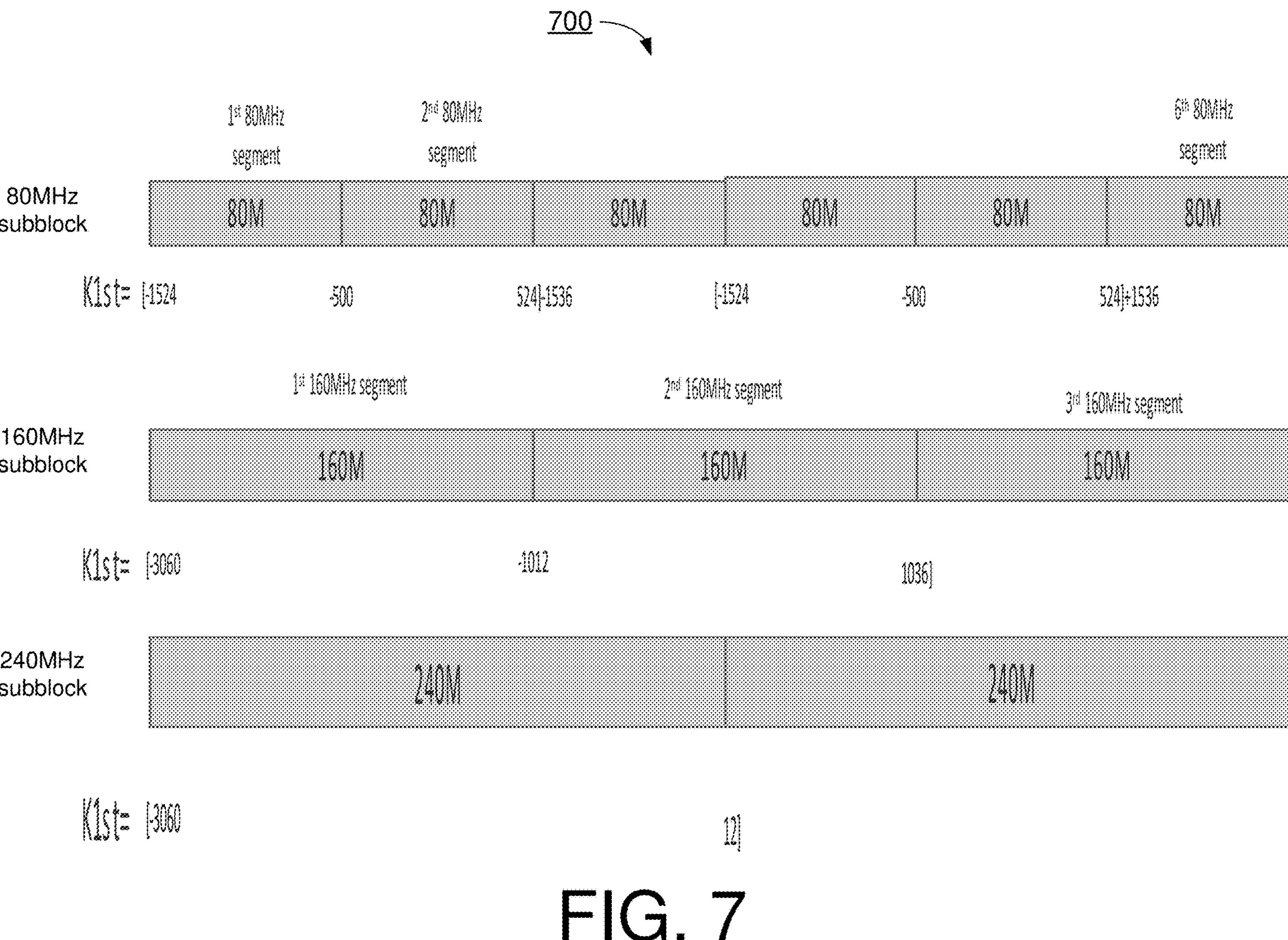
FIG. 7 is a diagram of an example scenario under a proposed scheme in accordance with the present disclosure.

FIG. 7 illustrates an example scenario 700 under a proposed scheme in accordance with the present disclosure. Scenario 700 may pertain to examples showing values of the K1st index of a distribution frequency segment/subblock in a wider system bandwidth of 480 MHz. Referring to FIG. 7, the K1st index value for each 80 MHz frequency segment/subblock in a lower 240 MHz half of the 480 MHz may be one of K1st=[−1524 −500 524]−1536, and the K1st index value for each 80 MHz frequency segment/subblock in an upper 240 MHz half of the 480 MHz may be one of K1st=[−1524 −500 524]+1536. Moreover, the K1st index value for each 160 MHz frequency segment/subblock in 480 MHz may be one of K1st=[−3060 −1012 1036]. Furthermore, the K1st index value for each 240 MHz frequency segment/subblock in 480 MHz may be one of K1st=[−3060 12].

Figure 8:
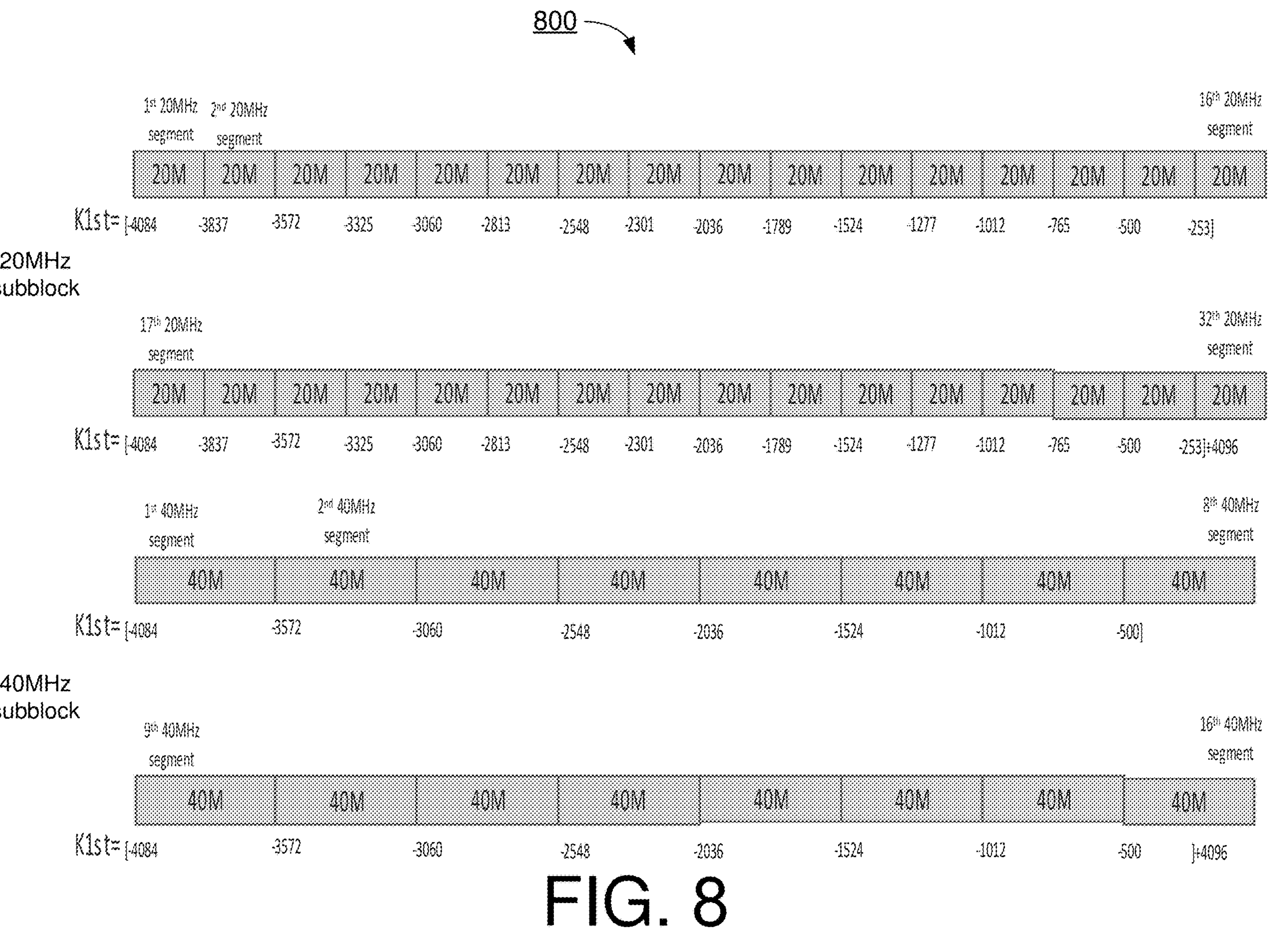
FIG. 8 is a diagram of an example scenario under a proposed scheme in accordance with the present disclosure.

FIG. 8 illustrates an example scenario 800 under a proposed scheme in accordance with the present disclosure. Scenario 800 may pertain to examples showing values of the K1st index of a distribution frequency segment/subblock in a wider system bandwidth of 640 MHz. Referring to FIG. 8, the K1st index value for each 20 MHz frequency segment/subblock in a lower 320 MHz half of the 640 MHz may be one of K1st=[−4084 −3837−3572 −3325 −3060 −2813 −2548 −2301 −2036 −1789 −1524 −1277 −1012 −765 −500 −253], and the K1st index value for each 20 MHz frequency segment/subblock in an upper 320 MHz half of the 640 MHz may be one of K1st=[−4084 −3837 −3572 −3325 −3060 −2813 −2548 −2301 −2036 −1789 −1524 −1277 −1012 −765 −500 −253]+4096. Moreover, the K1st index value for each 40 MHz frequency segment/subblock in the lower 320 MHz half of the 640 MHz may be one of K1st=[−4084 −3572 −3060 −2548 −2036 −1524 −1012 −500], and the K1st index value for each 40 MHz frequency segment/subblock in the upper 320 MHz half of the 640 MHz may be one of K1st=[−4084 −3572 −3060 −2548 −2036 −1524 −1012 −500]+4096.

Figure 9:
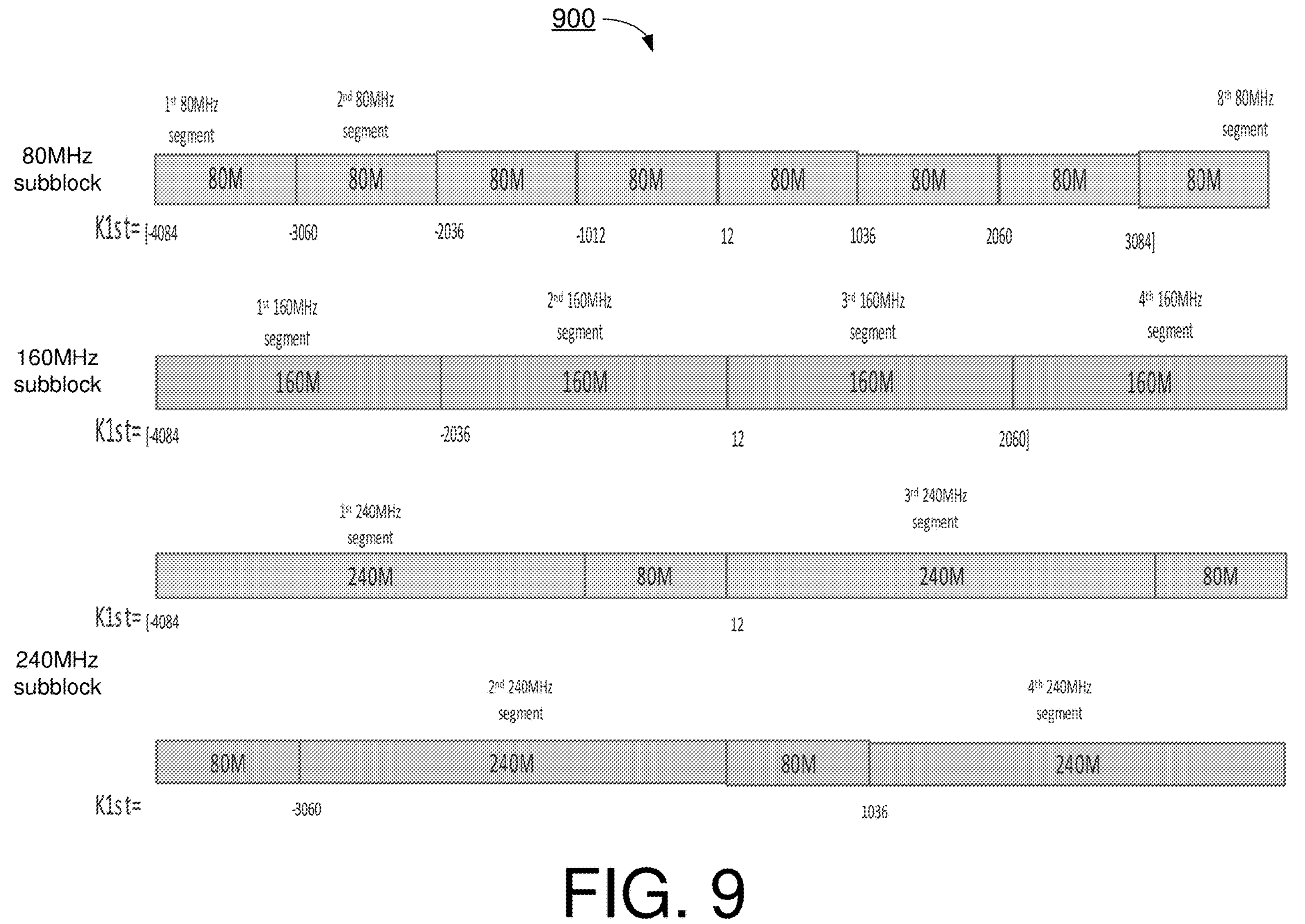
FIG. 9 is a diagram of an example scenario under a proposed scheme in accordance with the present disclosure.

FIG. 9 illustrates an example scenario 900 under a proposed scheme in accordance with the present disclosure. Scenario 900 may pertain to examples showing values of the K1st index of a distribution frequency segment/subblock in a wider system bandwidth of 640 MHz. Referring to FIG. 9, the K1st index value for each 80 MHz frequency segment/subblock in the 640 MHz may be one of K1st=[−4084 −3060 −2036 −1012 12 1036 2060 3084]. Additionally, the K1st index value for each 160 MHz frequency segment/subblock in the 640 MHz may be one of K1st=[−4084 −2036 12 2060]. Moreover, the K1st index value for each 240 MHz frequency segment/subblock in the 640 MHz may be one of K1st=[−4084 −3060 12 1036].

Figure 10:
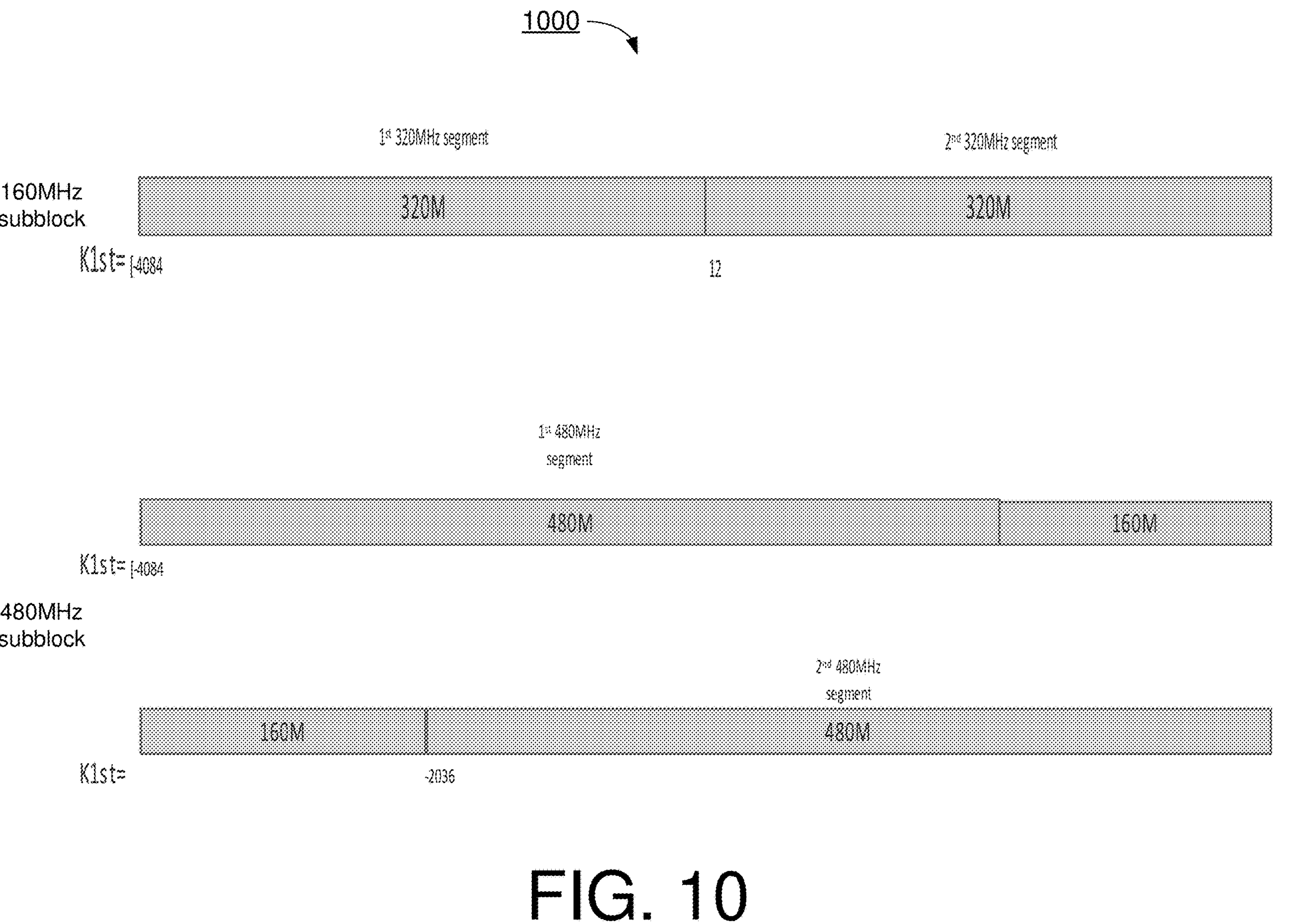
FIG. 10 is a diagram of an example scenario under a proposed scheme in accordance with the present disclosure.

FIG. 10 illustrates an example scenario 1000 under a proposed scheme in accordance with the present disclosure. Scenario 1000 may pertain to examples showing values of the K1st index of a distribution frequency segment/subblock in a wider system bandwidth of 640 MHz. Referring to FIG. 10, the K1st index value for each 160 MHz frequency segment/subblock in the 640 MHz may be one of K1st=[−4084 12]. Furthermore, the K1st index value for each 480 MHz frequency segment/subblock in the 640 MHz may be one of K1st=[−4084 −2036].

FIG. 11 illustrates an example design 1100 under a proposed scheme in accordance with the present disclosure. Design 1100 may pertain to $K_{shift}$ for a one-step option. Referring to FIG. 11, the leftmost column of the table lists distribution frequency segments/subblocks of different sizes including 20 MHz, 40 MHz, 80 MHz, 160 MHz, 240 MHz, 320 MHz and 480 MHz. The top row of the table lists system bandwidths of different sizes including 80 MHz, 160 MHz, 240 MHz, 320 MHz, 480 MHz and 640 MHz, which are also referred to as physical-layer protocol data unit (PPDU) bandwidths.

Figure 12:
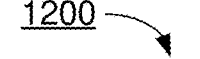
FIG. 12 is a diagram of an example design under a proposed scheme in accordance with the present disclosure.

FIG. 12 illustrates an example design 1200 under a proposed scheme in accordance with the present disclosure. Design 1200 may pertain to data and pilot subcarrier indices for DRUs in a 20 MHz extremely-high throughput (EHT) PPDU. Referring to FIG. 12, the table shows value ranges of indices of DRUs of different sizes including 26-tone DRU (DRU26), 52-tone DRU (DRU52) and 106-tone DRU (DRU106).

Figure 13:
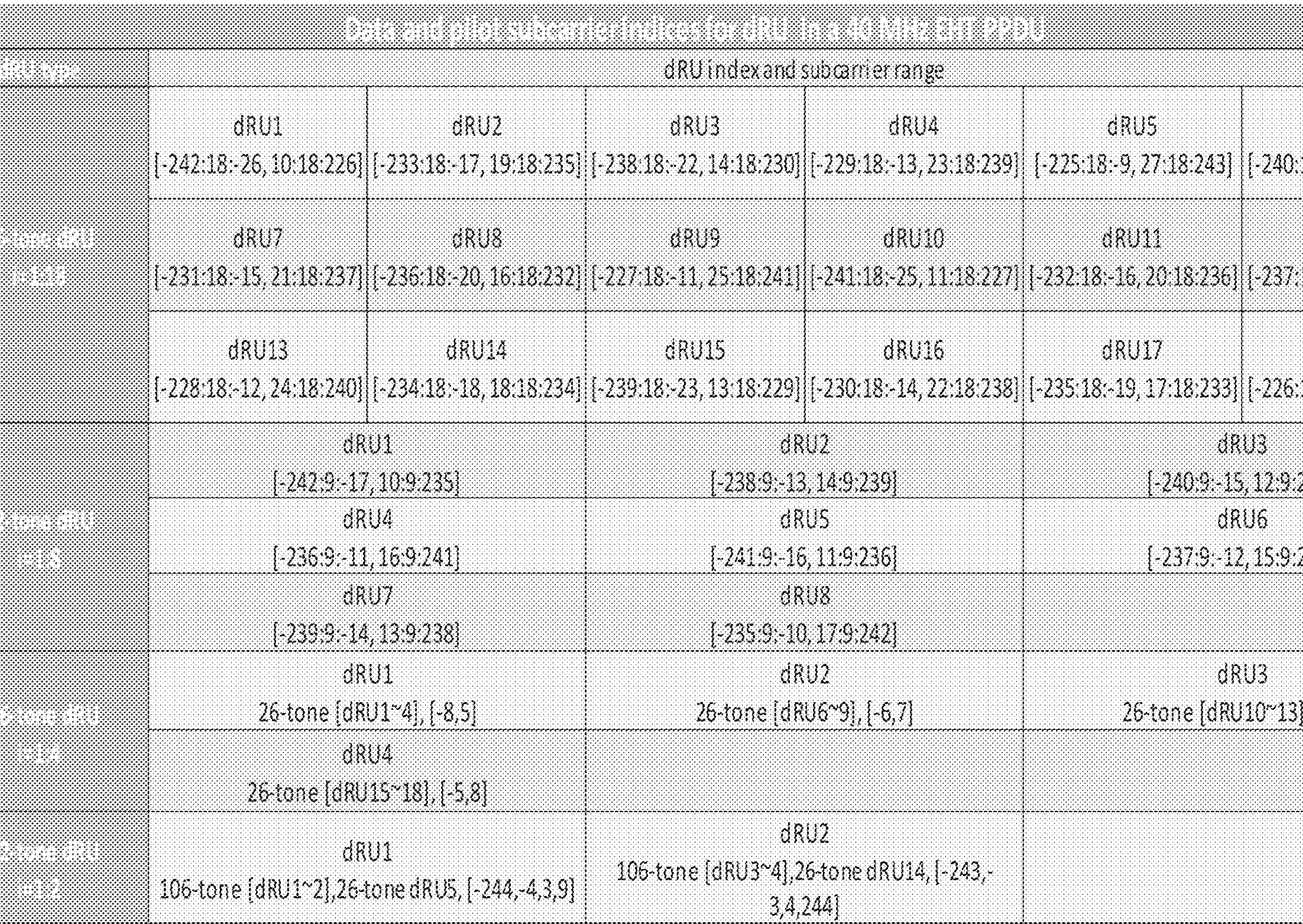
FIG. 13 is a diagram of an example design under a proposed scheme in accordance with the present disclosure.

FIG. 13 illustrates an example design 1300 under a proposed scheme in accordance with the present disclosure. Design 1300 may pertain to data and pilot subcarrier indices for DRUs in a 40 MHz EHT PPDU. Referring to FIG. 13, the table shows value ranges of indices of DRUs of different sizes including DRU26, DRU52, DRU106 and 242-tone DRU (DRU242).

FIG. 14 illustrates an example design 1400 under a proposed scheme in accordance with the present disclosure. Design 1400 may pertain to data and pilot subcarrier indices for DRUs in an 80 MHz EHT PPDU. Referring to FIG. 14, the table shows value ranges of indices of DRUs of different sizes including DRU52, DRU106, DRU242 and 484-tone DRU (DRU484).

FIG. 15 illustrates an example design 1500 under a proposed scheme in accordance with the present disclosure. Design 1500 may pertain to data and pilot subcarrier indices for DRUs in a 160 MHz EHT PPDU. Referring to FIG. 15, the table shows value ranges of indices of DRUs of different sizes including DRU106, DRU242, DRU484 and 996-tone DRU (DRU996).

Figure 16:
FIG. 16 is a diagram of an example design under a proposed scheme in accordance with the present disclosure.

FIG. 16 illustrates an example design 1600 under a proposed scheme in accordance with the present disclosure. Design 1600 may pertain to data and pilot subcarrier indices for DRUs in a 320 MHz EHT PPDU. Referring to FIG. 16, the table shows value ranges of indices of DRUs of different sizes including DRU484, DRU996 and 2×996-tone DRU (DRU(2×996)).

FIG. 17 illustrates an example design 1700 under a proposed scheme in accordance with the present disclosure. Design 1700 may pertain to data and pilot subcarrier indices for DRUs in a 240 MHz EHT PPDU. Referring to FIG. 17, the table shows value ranges of indices of DRUs of different sizes including DRU106, DRU242, DRU484 and DRU996.

FIG. 18 illustrates an example design 1800 under a proposed scheme in accordance with the present disclosure.

Design 1800 may pertain to data and pilot subcarrier indices for DRUs in a 480 MHz EHT PPDU. Referring to FIG. 18, the table shows value ranges of indices of DRU242.

Figure 19:
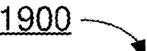
FIG. 19 is a diagram of an example design under a proposed scheme in accordance with the present disclosure.

FIG. 19 illustrates an example design 1900 under a proposed scheme in accordance with the present disclosure. Design 1900 may pertain to data and pilot subcarrier indices for DRUs in a 480 MHz EHT PPDU. Referring to FIG. 19, the table shows value ranges of indices of DRUs of different sizes including DRU484, DRU996 and DRU(2×996).

Illustrative Implementations

Figure 20:
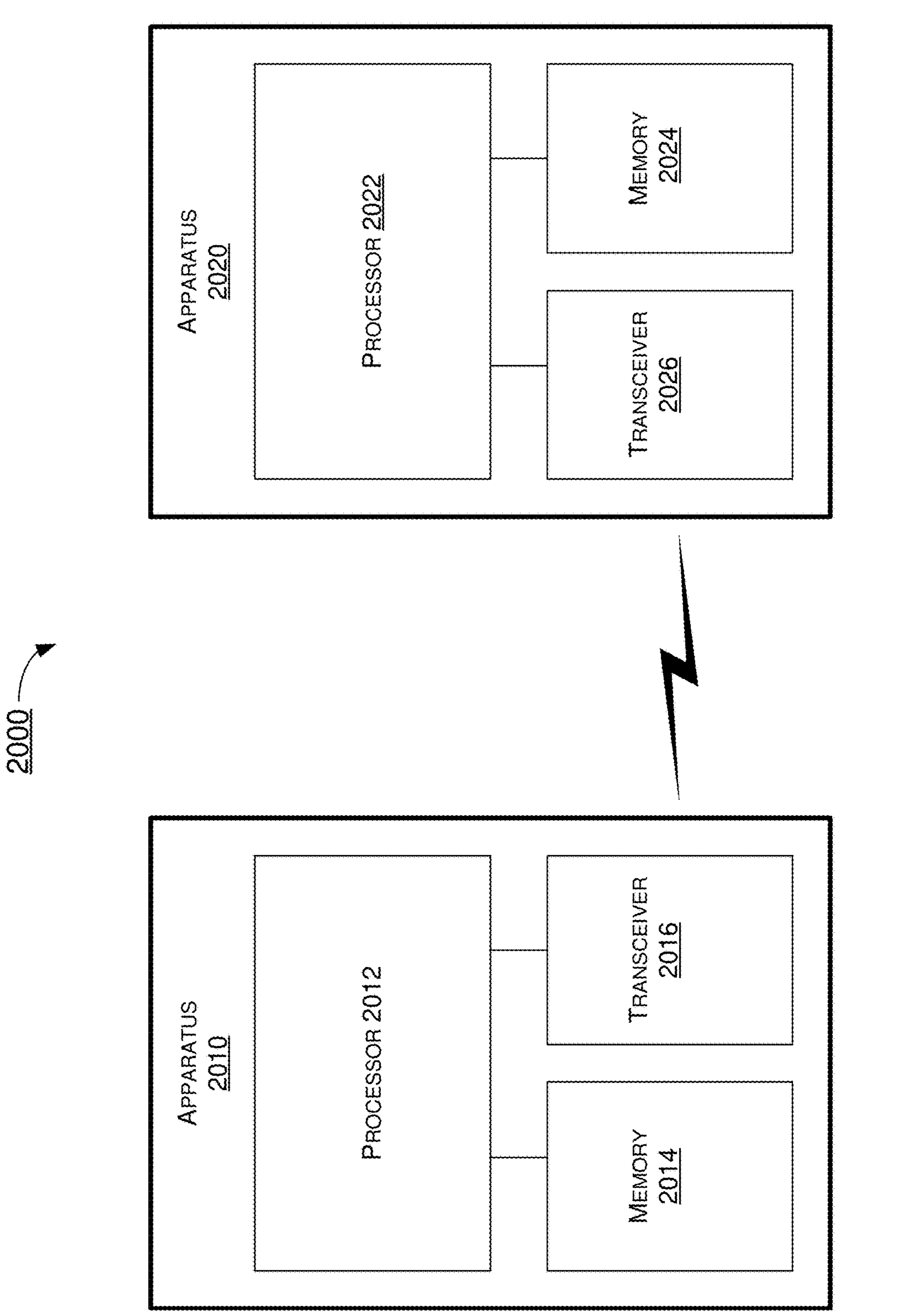
FIG. 20 is a block diagram of an example communication system in accordance with an implementation of the present disclosure.

FIG. 20 illustrates an example system 2000 having at least an example apparatus 2010 and an example apparatus 2020 in accordance with an implementation of the present disclosure. Each of apparatus 2010 and apparatus 2020 may perform various functions to implement schemes, techniques, processes and methods described herein pertaining to DRU transmission of frequency subblocks or frequency segments of wide bandwidths in wireless communications, including the various schemes described above with respect to various proposed designs, concepts, schemes, systems and methods described above as well as processes described below. For instance, apparatus 2010 may be implemented in STA 110 and apparatus 2020 may be implemented in STA 120, or vice versa.

Each of apparatus 2010 and apparatus 2020 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 2010 and apparatus 2020 may be implemented in a smartphone, a smartwatch, a personal digital assistant, a digital camera, or a computing equipment such as a tablet computer, a laptop computer or a notebook computer. Each of apparatus 2010 and apparatus 2020 may also be a part of a machine type apparatus, which may be an IoT apparatus such as an immobile or a stationary apparatus, a home apparatus, a wire communication apparatus or a computing apparatus. For instance, each of apparatus 2010 and apparatus 2020 may be implemented in a smart thermostat, a smart fridge, a smart door lock, a wireless speaker or a home control center. When implemented in or as a network apparatus, apparatus 2010 and/or apparatus 2020 may be implemented in a network node, such as an AP in a WLAN.

In some implementations, each of apparatus 2010 and apparatus 2020 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 2010 and apparatus 2020 may be implemented in or as a STA or an AP. Each of apparatus 2010 and apparatus 2020 may include at least some of those components shown in FIG. 20 such as a processor 2012 and a processor 2022, respectively, for example. Each of apparatus 2010 and apparatus 2020 may further include one or more other components not pertinent to the proposed scheme of the present disclosure (e.g., internal power supply, display device and/or user interface device), and, thus, such component(s) of apparatus 2010 and apparatus 2020 are neither shown in FIG. 20 nor described below in the interest of simplicity and brevity.

In one aspect, each of processor 2012 and processor 2022 may be implemented in the form of one or more single-core processors, one or more multi-core processors, one or more RISC processors or one or more CISC processors. That is, even though a singular term "a processor" is used herein to refer to processor 2012 and processor 2022, each of processor 2012 and processor 2022 may include multiple processors in some implementations and a single processor in other implementations in accordance with the present disclosure. In another aspect, each of processor 2012 and processor 2022 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 2012 and processor 2022 is a special-purpose machine specifically designed, arranged and configured to perform specific tasks including those pertaining to DRU transmission of frequency subblocks or frequency segments of wide bandwidths in wireless communications in accordance with various implementations of the present disclosure.

In some implementations, apparatus 2010 may also include a transceiver 2016 coupled to processor 2012. Transceiver 2016 may include a transmitter capable of wirelessly transmitting and a receiver capable of wirelessly receiving data. In some implementations, apparatus 2020 may also include a transceiver 2026 coupled to processor 2022. Transceiver 2026 may include a transmitter capable of wirelessly transmitting and a receiver capable of wirelessly receiving data. It is noteworthy that, although transceiver 2016 and transceiver 2026 are illustrated as being external to and separate from processor 2012 and processor 2022, respectively, in some implementations, transceiver 2016 may be an integral part of processor 2012 as a system on chip (SoC), and transceiver 2026 may be an integral part of processor 2022 as a SoC.

In some implementations, apparatus 2010 may further include a memory 2014 coupled to processor 2012 and capable of being accessed by processor 2012 and storing data therein. In some implementations, apparatus 2020 may further include a memory 2024 coupled to processor 2022 and capable of being accessed by processor 2022 and storing data therein. Each of memory 2014 and memory 2024 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 2014 and memory 2024 may include a type of read-only memory (ROM) such as mask ROM, programmable ROM (PROM), erasable programmable ROM (EPROM) and/or electrically erasable programmable ROM (EEPROM). Alternatively, or additionally, each of memory 2014 and memory 2024 may include a type of non-volatile random-access memory (NVRAM) such as flash memory, solid-state memory, ferroelectric RAM (FeRAM), magnetoresistive RAM (MRAM) and/or phase-change memory.

Each of apparatus 2010 and apparatus 2020 may be a communication entity capable of communicating with each other using various proposed schemes in accordance with the present disclosure. For illustrative purposes and without limitation, a description of capabilities of apparatus 2010, as STA 110, and apparatus 2020, as STA 120, is provided below in the context of example process 2100. It is noteworthy that, although a detailed description of capabilities, functionalities and/or technical features of either of apparatus 2010 and apparatus 2020 is provided below, the same may be applied to the other of apparatus 2010 and apparatus 2020 although a detailed description thereof is not provided solely in the interest of brevity. It is also noteworthy that, although the example implementations described below are provided in the context of WLAN, the same may be implemented in other types of networks.

Illustrative Processes

FIG. 21 illustrates an example process 2100 in accordance with an implementation of the present disclosure. Process 2100 may represent an aspect of implementing various proposed designs, concepts, schemes, systems and methods described above. More specifically, process 2100 may represent an aspect of the proposed concepts and schemes pertaining to DRU transmission of frequency subblocks or frequency segments of wide bandwidths in wireless communications in accordance with the present disclosure. Process 2100 may include one or more operations, actions, or functions as illustrated by one or more of blocks 2110 and 2120. Although illustrated as discrete blocks, various blocks of process 2100 may be divided into additional blocks, combined into fewer blocks, or eliminated, depending on the desired implementation. Moreover, the blocks/sub-blocks of process 2100 may be executed in the order shown in FIG. 21 or, alternatively, in a different order. Furthermore, one or more of the blocks/sub-blocks of process 2100 may be executed repeatedly or iteratively. Process 2100 may be implemented by or in apparatus 2010 and apparatus 2020 as well as any variations thereof. Solely for illustrative purposes and without limiting the scope, process 2100 is described below in the context of apparatus 2010 implemented in or as STA 110 functioning as a non-AP STA and apparatus 2020 implemented in or as STA 120 functioning as an AP STA of a wireless network such as a WLAN in network environment 100 in accordance with one or more of IEEE 802.11 standards. Process 2100 may begin at block 2110.

At 2110, process 2100 may involve processor 2012 of apparatus 2010 generating a DRU with tones or subcarriers of the DRU distributed in a frequency segment or subblock. Process 2100 may proceed from 2110 to 2120.

At 2120, process 2100 may involve processor 2012 communicating, via transceiver 2016, wirelessly (e.g., with apparatus 2020) with the DRU in the frequency segment or subblock of a bandwidth of 240 MHz or wider.

In some implementations, in generating the DRU, process 2100 may involve processor 2012 generating the DRU on: (a) a 20 MHz frequency segment or subblock of a 240 MHz, 480 MHz or 640 MHz bandwidth; or (b) a 40 MHz frequency segment or subblock of the 240 MHz, 480 MHz or 640 MHz bandwidth; or (c) an 80 MHz frequency segment or subblock of the 240 MHz, 480 MHz or 640 MHz bandwidth; or (d) a 160 MHz frequency segment or subblock of the 240 MHz, 480 MHz or 640 MHz bandwidth or a 320 MHz bandwidth; or (e) a 240 MHz frequency segment or subblock of the 320 MHz, 480 MHz or 640 MHz bandwidth; or (f) a 320 MHz frequency segment or subblock of the 480 MHz or 640 MHz bandwidth; or (g) a 480 MHz frequency segment or subblock of the 640 MHz bandwidth.

In some implementations, in generating the DRU, process 2100 may involve processor 2012 distributing the tones or subcarriers of the DRU onto the frequency segment or subblock of the bandwidth with indices of the tones or subcarriers of the DRU expressed as $K_{DRU\_i}=k_{DRU}+K_{shift}(i)$. In this expression: $K_{DRU}$ may denote a DRU subcarrier index; $K_{DRU\_i}$ may denote a specific DRU subcarrier index on an $i^{th}$ frequency segment or subblock; $K_{shift}(i)$ may denote a constant shift value corresponding to the $i^{th}$ frequency segment or subblock; i may denote an index value of the frequency segment or subblock; $K_{shift}(i)$=(a) 120+K1st for a subblock size of 20 MHz or (b) 244+K1st for a subblock size of 40 MHz or (c) 500+K1st for a subblock size of 80 MHz or (d) 1012+K1st for a subblock size of 160 MHz or (e) 1524+K1st for a subblock size of 240 MHz or (f) 2036+K1st for a subblock size of 320 MHz or (g) 3060+K1st for a subblock size of 480 MHz. Moreover, K1st may denote a starting or first tone index of a corresponding frequency segment or subblock i of the subblock size 20 MHz, 40 MHz, 80 MHz, 160 MHz, 240 MHz, 320 MHz or 480 MHz.

In some implementations, the tones or subcarriers of the DRU may be distributed onto a 20 MHz frequency segment or subblock of a 240 MHz, 480 MHz or 640 MHz bandwidth. In such cases: (a) $K_{shift}$=120+[−1524, −1277, −1012, −765, −500, −253, 12, 259, 524, 771, 1036, 1283] for the 240 MHz bandwidth; or (b) $K_{shift}$=120+[−3060, −2813, −2548, −2301, −2036, −1789, −1524, −1277, −1012, −765, −500, −253, −12, 259, 524, 771, 1036, 1283, 1548, 1795, 2060, 2307] for the 480 MHz bandwidth; or (c) $K_{shift}$=120+[−4084, −3927, −3572, −3325, −3060, −2813, −2548, −2301, −2036, −1789, −1524, −1277, −1012, −765 −500, −253, −12, 12, 259, 524, 771, 1036, 1283, 1548, 1795, 2060, 2307, 2572, 2819, 3084, 3331, 3596, 3843] for the 640 MHz bandwidth.

In some implementations, the tones or subcarriers of the DRU may be distributed onto a 40 MHz frequency segment or subblock of a 240 MHz, 480 MHz or 640 MHz bandwidth. In such cases: (a) $K_{shift}$=[−5 −3 −1 1, 3, 5]*256 for the 240 MHz bandwidth; or (b) $K_{shift}$=[−11, −9, −7, −5, −3, −1, 1, 3, 5, 7, 9, 11]*256 for the 480 MHz bandwidth; or (c) $K_{shift}$=[−15:2:15]*256 for the 640 MHz bandwidth.

In some implementations, the tones or subcarriers of the DRU may be distributed onto an 80 MHz frequency segment or subblock of a 240 MHz, 480 MHz or 640 MHz bandwidth. In such cases: (a) $K_{shift}$=[−1, 0, 1]*1024 for the 240 MHz bandwidth; or (b) $K_{shift}$=[−5, −3, −1, 1, 3, 5]*512 for the 480 MHz bandwidth; or (c) $K_{shift}$=[−7, −5, −3, −1 1, 3, 5, 7]*512 for the 640 MHz bandwidth.

In some implementations, the tones or subcarriers of the DRU may be distributed onto a 160 MHz frequency segment or subblock of a 240 MHz, 320 MHz, 480 MHz or 640 MHz bandwidth. In such cases: (a) $K_{shift}$=[−1, 1]*512 for the 240 MHz bandwidth; or (b) $K_{shift}$=[−1, 1]*1024 for the 320 MHz bandwidth; or (c) $K_{shift}$=[−1, 0, 1]*2048 for the 480 MHz bandwidth; or (d) $K_{shift}$=[−3, −1, 1, 3]*1024 for the 640 MHz bandwidth.

In some implementations, the tones or subcarriers of the DRU may be distributed onto a 240 MHz frequency segment or subblock of a 320 MHz, 480 MHz or 640 MHz bandwidth. In such cases: (a) $K_{shift}$=[−1, 1]*512 for the 320 MHz bandwidth; or (b) $K_{shift}$=[−1, 1]*1536 for the 480 MHz bandwidth; or (c) $K_{shift}$=[−5, −3, 3, 5]*512 for the 640 MHz bandwidth.

In some implementations, the tones or subcarriers of the DRU may be distributed onto a 320 MHz frequency segment or subblock of a 480 MHz or 640 MHz bandwidth. In such cases: (a) $K_{shift}$=[−1, 1]*1024 for the 480 MHz bandwidth; or (b) $K_{shift}$=[−1, 1]*2048 for the 640 MHz bandwidth.

In some implementations, the tones or subcarriers of the DRU may be distributed onto a 480 MHz frequency segment or subblock of a 640 MHz bandwidth. In such cases, $K_{shift}$=[−1, 1]*1024 for the 640 MHz bandwidth.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

generating, by a processor of an apparatus, a distributed-tone resource unit (DRU) with tones or subcarriers of the DRU distributed in a frequency segment or subblock; and communicating, by the processor, wirelessly with the DRU in the frequency segment or subblock of a bandwidth of 240 MHz or wider, wherein the generating of the DRU comprises distributing the tones or subcarriers of the DRU onto the frequency segment or subblock of the bandwidth with indices of the tones or subcarriers of the DRU expressed as:

$$K_{DRU\_i} = k_{DRU} + K_{shift}(i),$$

wherein:

$K_{DRU}$ denotes a DRU subcarrier index;

$K_{DRU\_i}$ denotes a specific DRU subcarrier index on an $i^{th}$ frequency segment or subblock;

$K_{shift}(i)$ denotes a constant shift value corresponding to the $i^{th}$ frequency segment or subblock;

i denotes an index value of the frequency segment or subblock;

$K_{shift}(i)$=

120+K1st for a subblock size of 20 MHz or
244+K1st for a subblock size of 40 MHz or
500+K1st for a subblock size of 80 MHz or
1012+K1st for a subblock size of 160 MHz or
1524+K1st for a subblock size of 240 MHz or
2036+K1st for a subblock size of 320 MHz or
3060+K1st for a subblock size of 480 MHz; and K1st denotes a starting or first tone index of a corresponding frequency segment or subblock i of the subblock size 20 MHz, 40 MHz, 80 MHz, 160 MHz, 240 MHz, 320 MHz or 480 MHz.

2. The method of claim 1, wherein the generating of the DRU comprises generating the DRU on:

a 20 MHz frequency segment or subblock of a 240 MHz, 480 MHz or 640 MHz bandwidth; or a 40 MHz frequency segment or subblock of the 240 MHz, 480 MHz or 640 MHz bandwidth; or an 80 MHz frequency segment or subblock of the 240 MHz, 480 MHz or 640 MHz bandwidth; or a 160 MHz frequency segment or subblock of the 240 MHz, 480 MHz or 640 MHz bandwidth or a 320 MHz bandwidth; or a 240 MHz frequency segment or subblock of the 320 MHz, 480 MHz or 640 MHz bandwidth; or a 320 MHz frequency segment or subblock of the 480 MHz or 640 MHz bandwidth; or a 480 MHz frequency segment or subblock of the 640 MHz bandwidth.

3. The method of claim 1, wherein the tones or subcarriers of the DRU are distributed onto a 20 MHz frequency segment or subblock of a 240 MHz, 480 MHz or 640 MHz bandwidth, and wherein:

$K_{shift}$=120+[−1524, −1277, −1012, −765, −500, −253, 12, 259, 524, 771, 1036, 1283] for the 240 MHz bandwidth; or $K_{shift}$=120+[−3060, −2813, −2548, −2301, −2036, −1789, −1524, −1277, −1012, −765, −500, −253, −12, 259, 524, 771, 1036, 1283, 1548, 1795, 2060, 2307] for the 480 MHz bandwidth; or $K_{shift}$=120+[−4084, −3927, −3572, −3325, −3060, −2813, −2548, −2301, −2036, −1789, −1524, −1277, −1012, −765-500, −253, −12, 12, 259, 524, 771, 1036, 1283, 1548, 1795, 2060, 2307, 2572, 2819, 3084, 3331, 3596, 3843] for the 640 MHz bandwidth.

4. The method of claim 1, wherein the tones or subcarriers of the DRU are distributed onto a 40 MHz frequency segment or subblock of a 240 MHz, 480 MHz or 640 MHz bandwidth, and wherein:

$K_{shift}$=[−5 −3 −1 1, 3, 5]*256 for the 240 MHz bandwidth; or $K_{shift}$=[−11, −9, −7, −5, −3, −1, 1, 3, 5, 7, 9, 11]*256 for the 480 MHz bandwidth; or $K_{shift}$=[−15:2:15]*256 for the 640 MHz bandwidth.

5. The method of claim 1, wherein the tones or subcarriers of the DRU are distributed onto an 80 MHz frequency segment or subblock of a 240 MHz, 480 MHz or 640 MHz bandwidth, and wherein:

$K_{shift}$=[−1, 0, 1]*1024 for the 240 MHz bandwidth; or $K_{shift}$=[−5, −3, −1, 1, 3, 5]*512 for the 480 MHz bandwidth; or $K_{shift}$=[−7, −5, −3, −1 1, 3, 5, 7]*512 for the 640 MHz bandwidth.

6. The method of claim 1, wherein the tones or subcarriers of the DRU are distributed onto a 160 MHz frequency segment or subblock of a 240 MHz, 320 MHz, 480 MHz or 640 MHz bandwidth, and wherein:

$K_{shift}$=[−1, 1]*512 for the 240 MHz bandwidth; or $K_{shift}$=[−1, 1]*1024 for the 320 MHz bandwidth; or $K_{shift}$=[−1, 0, 1]*2048 for the 480 MHz bandwidth; or $K_{shift}$=[−3, −1, 1, 3]*1024 for the 640 MHz bandwidth.

7. The method of claim 1, wherein the tones or subcarriers of the DRU are distributed onto a 240 MHz frequency segment or subblock of a 320 MHz, 480 MHz or 640 MHz bandwidth, and wherein:

$K_{shift}$=[−1, 1]*512 for the 320 MHz bandwidth; or $K_{shift}$=[−1, 1]*1536 for the 480 MHz bandwidth; or $K_{shift}$=[−5, −3, 3, 5]*512 for the 640 MHz bandwidth.

8. The method of claim 1, wherein the tones or subcarriers of the DRU are distributed onto a 320 MHz frequency segment or subblock of a 480 MHz or 640 MHz bandwidth, and wherein:

$K_{shift}$=[−1, 1]*1024 for the 480 MHz bandwidth; or $K_{shift}$=[−1, 1]*2048 for the 640 MHz bandwidth.

9. The method of claim 1, wherein the tones or subcarriers of the DRU are distributed onto a 480 MHz frequency segment or subblock of a 640 MHz bandwidth, and wherein $K_{shift}$=[−1, 1]*1024 for the 640 MHz bandwidth.

10. An apparatus, comprising:

a transceiver configured to communicate wirelessly; and a processor coupled to the transceiver and configured to perform operations comprising:

generating a distributed-tone resource unit (DRU) with tones or subcarriers of the DRU distributed in a frequency segment or subblock; and communicating, via the transceiver, wirelessly with the DRU in the frequency segment or subblock of a bandwidth of 240 MHz or wider, wherein the generating of the DRU comprises distributing the tones or subcarriers of the DRU onto the frequency segment or subblock of the bandwidth with indices of the tones or subcarriers of the DRU expressed as:

$$K_{DRU\_i}=K_{DRU}+K_{shift}(i),$$

wherein:

$K_{DRU}$ denotes a DRU subcarrier index;

$K_{DRU\_i}$ denotes a specific DRU subcarrier index on an $i^{th}$ frequency segment or subblock;

$K_{shift}(i)$ denotes a constant shift value corresponding to the $i^{th}$ frequency segment or subblock;

i denotes an index value of the frequency segment or subblock;

$K_{shift}(i)$=

120+K1st for a subblock size of 20 MHz or
244+K1st for a subblock size of 40 MHz or
500+K1st for a subblock size of 80 MHz or
1012+K1st for a subblock size of 160 MHz or
1524+K1st for a subblock size of 240 MHz or
2036+K1st for a subblock size of 320 MHz or
3060+K1st for a subblock size of 480 MHz; and K1st denotes a starting or first tone index of a corresponding frequency segment or subblock i of the subblock size 20 MHz, 40 MHz, 80 MHz, 160 MHz, 240 MHz, 320 MHz or 480 MHz.

11. The apparatus of claim 10, wherein the generating of the DRU comprises generating the DRU on:

a 20 MHz frequency segment or subblock of a 240 MHz, 480 MHz or 640 MHz bandwidth; or a 40 MHz frequency segment or subblock of the 240 MHz, 480 MHz or 640 MHz bandwidth; or an 80 MHz frequency segment or subblock of the 240 MHz, 480 MHz or 640 MHz bandwidth; or a 160 MHz frequency segment or subblock of the 240 MHz, 480 MHz or 640 MHz bandwidth or a 320 MHz bandwidth; or a 240 MHz frequency segment or subblock of the 320 MHz, 480 MHz or 640 MHz bandwidth; or a 320 MHz frequency segment or subblock of the 480 MHz or 640 MHz bandwidth; or a 480 MHz frequency segment or subblock of the 640 MHz bandwidth.

12. The apparatus of claim 10, wherein the tones or subcarriers of the DRU are distributed onto a 20 MHz frequency segment or subblock of a 240 MHz, 480 MHz or 640 MHz bandwidth, and wherein:

$K_{shift}$=120+[−1524, −1277, −1012, −765, −500, −253, 12, 259, 524, 771, 1036, 1283] for the 240 MHz bandwidth; or $K_{shift}$=120+[−3060, −2813, −2548, −2301, −2036, −1789, −1524, −1277, −1012, −765, −500, −253, −12, 259, 524, 771, 1036, 1283, 1548, 1795, 2060, 2307] for the 480 MHz bandwidth; or $K_{shift}$=120+[−4084, −3927, −3572, −3325, −3060, −2813, −2548, −2301, −2036, −1789, −1524, −1277, −1012, −765 −500, −253, −12, 12, 259, 524, 771, 1036, 1283, 1548, 1795, 2060, 2307, 2572, 2819, 3084, 3331, 3596, 3843] for the 640 MHz bandwidth.

13. The apparatus of claim 10, wherein the tones or subcarriers of the DRU are distributed onto a 40 MHz frequency segment or subblock of a 240 MHz, 480 MHz or 640 MHz bandwidth, and wherein:

$K_{shift}$=[−5 −3 −1 1, 3, 5]*256 for the 240 MHz bandwidth; or $K_{shift}$=[−11, −9, −7, −5, −3, −1, 1, 3, 5, 7, 9, 11]*256 for the 480 MHz bandwidth; or $K_{shift}$=[−15:2:15]*256 for the 640 MHz bandwidth.

14. The apparatus of claim 10, wherein the tones or subcarriers of the DRU are distributed onto an 80 MHz frequency segment or subblock of a 240 MHz, 480 MHz or 640 MHz bandwidth, and wherein:

$K_{shift}$=[−1, 0, 1]*1024 for the 240 MHz bandwidth; or $K_{shift}$=[−5, −3, −1, 1, 3, 5]*512 for the 480 MHz bandwidth; or $K_{shift}$=[−7, −5, −3, −1 1, 3, 5, 7]*512 for the 640 MHz bandwidth.

15. The apparatus of claim 10, wherein the tones or subcarriers of the DRU are distributed onto a 160 MHz frequency segment or subblock of a 240 MHz, 320 MHz, 480 MHz or 640 MHz bandwidth, and wherein:

$K_{shift}$=[−1, 1]*512 for the 240 MHz bandwidth; or $K_{shift}$=[−1, 1]*1024 for the 320 MHz bandwidth; or $K_{shift}$=[−1, 0, 1]*2048 for the 480 MHz bandwidth; or $K_{shift}$=[−3, −1, 1, 3]*1024 for the 640 MHz bandwidth.

16. The apparatus of claim 10, wherein the tones or subcarriers of the DRU are distributed onto a 240 MHz frequency segment or subblock of a 320 MHz, 480 MHz or 640 MHz bandwidth, and wherein:

$K_{shift}$=[−1, 1]*512 for the 320 MHz bandwidth; or $K_{shift}$=[−1, 1]*1536 for the 480 MHz bandwidth; or $K_{shift}$=[−5, −3, 3, 5]*512 for the 640 MHz bandwidth.

17. The apparatus of claim 10, wherein the tones or subcarriers of the DRU are distributed onto a 320 MHz frequency segment or subblock of a 480 MHz or 640 MHz bandwidth, and wherein:

$K_{shift}$=[−1, 1]*1024 for the 480 MHz bandwidth; or $K_{shift}$=[−1, 1]*2048 for the 640 MHz bandwidth.

18. The apparatus of claim 10, wherein the tones or subcarriers of the DRU are distributed onto a 480 MHz frequency segment or subblock of a 640 MHz bandwidth, and wherein $K_{shift}$=[−1, 1]*1024 for the 640 MHz bandwidth.

* * * * *